US 12,316,474 B2

(12) United States Patent
Büttner et al.

(10) Patent No.: US 12,316,474 B2
(45) Date of Patent: May 27, 2025

(54) AUTOMATION SYSTEM HAVING A SUBSCRIBER STRUCTURE, DISTRIBUTOR AND METHOD FOR TELEGRAM TRANSMISSION

(71) Applicant: Beckhoff Automation GmbH, Verl (DE)

(72) Inventors: Holger Büttner, Berlin (DE); Dirk Janssen, Verl (DE); Erik Vonnahme, Salzkotten (DE); Thorsten Bunte, Gütersloh (DE); Thomas Rettig, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 170 days.

(21) Appl. No.: 18/186,649

(22) Filed: Mar. 20, 2023

(65) Prior Publication Data

US 2023/0231736 A1 Jul. 20, 2023

Related U.S. Application Data

(63) Continuation of application No. PCT/EP2021/078776, filed on Oct. 18, 2021.

(30) Foreign Application Priority Data

Oct. 22, 2020 (DE) .................. 10 2020 127 804.7

(51) Int. Cl.
*H04L 12/40* (2006.01)
*H04L 12/42* (2006.01)

(52) U.S. Cl.
CPC .. *H04L 12/40006* (2013.01); *H04L 12/40195* (2013.01); *H04L 12/40202* (2013.01); *H04L 2012/421* (2013.01)

(58) Field of Classification Search
CPC ......... H04L 12/40006; H04L 12/40202; H04L 12/40195; H04L 2012/421; H04L 2012/4026; H04L 69/40
See application file for complete search history.

(56) References Cited

U.S. PATENT DOCUMENTS 8,001,306 B2 8/2011 Beckhoff et al.
8,055,826 B2 11/2011 Janssen et al.
(Continued)

FOREIGN PATENT DOCUMENTS

CN 101176313 A 5/2008
CN 101427522 A 5/2009
(Continued)

OTHER PUBLICATIONS

"Application Note DK9321-0809-0004, EtherCAT master redundancy—warm stand-by," Beckhoff Automation GmbH, Aug. 2009, 10 pages with English translation.
(Continued)

*Primary Examiner* — Rasheed Gidado
(74) *Attorney, Agent, or Firm* — Dorsey & Whitney LLP

(57) ABSTRACT

An automation system has a plurality of subscribers including a first primary unit, first distributor, second primary unit, second distributor, and at least another subscriber unit. First and second transmitting/receiving devices of the first and second distributor are connected via a ring-shaped data bus. In a first mode, the first distributor forwards telegrams received from the first primary unit to the first transmitting/receiving device, and forwards telegrams received by the second transmitting/receiving device to the first primary unit. The second distributor also forwards first telegrams received by the first transmitting/receiving device to the second transmitting/receiving device. In a second mode, the second distributor forwards telegrams received by the second primary unit to the second transmitting/receiving
(Continued)

device, and the second distributor forwards telegrams received by the first transmitting/receiving device to the second primary unit. The first distributor also forwards telegrams received by the second transmitting/receiving device to the first transmitting/receiving device.

18 Claims, 6 Drawing Sheets

(56) References Cited

U.S. PATENT DOCUMENTS

| | | | |
|---|---|---|---|
| 8,234,427 B2 | 7/2012 | Buettner et al. | |
| 8,531,942 B2 | 9/2013 | Buttner et al. | |
| 10,102,163 B2 | 10/2018 | Spiegel et al. | |
| 10,117,286 B1* | 10/2018 | Jorgovanovic | H04L 65/80 |
| 10,581,633 B2 | 3/2020 | Pollmann | |
| 11,032,098 B2 | 6/2021 | Schlittenbauer et al. | |
| 2005/0232145 A1 | 10/2005 | Tanju | |
| 2006/0136604 A1 | 6/2006 | Schultze et al. | |
| 2009/0083464 A1 | 3/2009 | Beckhoff et al. | |
| 2013/0253666 A1* | 9/2013 | Premke | G05B 15/02 700/9 |
| 2014/0058533 A1* | 2/2014 | Grosch | G06F 11/1687 700/3 |
| 2018/0373659 A1* | 12/2018 | Amarilio | G06F 1/12 |
| 2022/0236712 A1 | 7/2022 | Büttner et al. | |

FOREIGN PATENT DOCUMENTS

| | | |
|---|---|---|
| CN | 101542981 A | 9/2009 |
| CN | 101584155 A | 11/2009 |
| DE | 102006055889 B3 | 5/2008 |
| DE | 102008037610 A1 | 7/2009 |
| DE | 102015105929 A1 | 10/2016 |
| DE | 102019131823 A1 | 5/2021 |
| EP | 1869836 B1 | 3/2009 |
| EP | 3072262 B1 | 7/2019 |
| EP | 3647888 A1 | 5/2020 |

OTHER PUBLICATIONS

Office Action dated Sep. 14, 2021 in connection with German patent application No. 10 2020 127 804.7, 12 pages including English translation.

International Search Report and Written Opinion dated Oct. 18, 2021 in connection with International Patent Application No. PCT/EP2021/078776, 41 pages including English translation.

Office Action dated Jan. 18, 2024 in connection with Chinese patent application No. 202180070767.X, 7 pages including partial English translation.

* cited by examiner

AUTOMATION SYSTEM HAVING A SUBSCRIBER STRUCTURE, DISTRIBUTOR AND METHOD FOR TELEGRAM TRANSMISSION

CROSS-REFERENCE TO RELATED APPLICATIONS

The present patent application is a continuation of International Patent Application PCT/EP2021/078776, filed Oct. 18, 2021, entitled "Automation System Having a Master-Slave Structure, Distributor, and Method for Telegram Transmission," which claims the priority of German patent application DE 10 2020 127 804.7, filed Oct. 22, 2020, entitled "Automatisierungssystem mit einer Master-Slave-Struktur, Verteiler and Verfahren zur Telegrammübertragung," each of which is incorporated by reference herein, in the entirety and for all purposes.

FIELD

The invention relates to an automation system having a master-slave structure, a distributor for use in an automation system, and a method for telegram transmission in such an automation system.

BACKGROUND

In manufacturing and automation technology, serial network systems are often used in which the decentrally arranged devices of a machine periphery, such as I/O modules, transmitters, drives, valves and operator terminals, communicate with automation, engineering or visualization systems. All subscribers are networked with one another via a serial data bus, preferably via a field bus, wherein the data exchange via the data bus is usually carried out on the basis of the master-slave principle in the form of data packets, also referred to as telegrams.

The master units on the data bus, usually the control units, have bus access authorization and determine the data transfer on the data bus. The slave units on the data bus, usually machine peripherals, do not have bus access authorization, i.e. they may only acknowledge telegrams received or transmit telegrams to a master unit upon request.

The telegrams, also referred to as frames, are composed of control data and user data. The Ethernet standard is often used as the protocol for controlling the data exchange on the data bus, which enables telegrams with a length of up to 1500 bytes at a simultaneously high transmission speed of up to 10 Gbit/sec.

The data bus of the master-slave automation system often has a ring structure in which the individual slave units on the transmission path are connected to form a ring, with each subscriber connected to two neighbors and the first and last subscriber in the ring connected to the master unit. The telegrams are transmitted in one direction starting from the master unit via its transmitting unit to the first connected slave unit and from there to the next, until the last slave unit in the ring in the data transmission direction is reached, and then from the last slave unit back to the receiving unit of the master unit.

A requirement of master-slave automation systems, especially when used in manufacturing and process automation, is a high fault tolerance, i.e. the ability of the automation system to guarantee the required function, i.e. for example the production of a workpiece, despite the occurrence of errors. Errors in the automation system that must be overcome without impairment include not only errors in the telegrams but also the failure of a subscriber in the transmission path or an interruption in the transmission path, for example by physical severance of the transmission medium.

EP 1 869 836 B1 describes a master-slave automation system in which the data bus has a double-ring topology with two separate communication paths connecting a master unit to slave units. The master unit generates two telegrams with an identical user data block, which circulate in opposite directions on the two communication paths. In the event of an error, i.e. a route error in the data bus, the two separate communication paths are short-circuited in the two slave units adjacent to the interruption point. By superimposing the user data blocks of the two telegrams after circulation in the master unit, a combined data field may be generated which contains all the data to be transmitted by the slave units, irrespective of how the telegrams are fed back to the master unit via the communication paths.

To compensate for the failure of a master unit, EP 3 072 262 B1 describes an extension of a master-slave automation system in which two master units are provided on the data bus. If one master unit fails, a second substitute master unit may then take over communication. To be able to perform such a switchover, the second substitute master unit requires additional hardware, which is why the substitute master unit cannot be implemented in any industrial PC, or only with additional effort.

DE 10 2006 055 889 B3 discloses an automation system having a redundant master unit, at least one slave unit and a ring-shaped data bus, wherein two distributors are also provided, each with a switching device via which the master units are connected to the ring-shaped data bus.

DE 10 2008 037 610 A1 describes an automation system having a redundant master unit, at least one slave unit and a ring-shaped data bus, wherein either the first or the second master unit is connected to the ring-shaped data bus by a changeover switch.

It is an object of the present invention to provide an automation system having a master-slave structure, a distributor for such an automation system, and a method for telegram transmission in such an automation system, which allow for improved reconfiguration of the telegram transmission path during master-unit operation change.

SUMMARY

The invention provides an automation system having a plurality of subscribers, and a ring-shaped data bus comprises as subscribers a first master unit, a first distributor, a second master unit, a second distributor and at least a slave unit.

According to a first aspect, an automation system comprises a plurality of subscribers and a ring-shaped data bus, the subscribers comprising a first master unit, a first distributor, a second master unit, a second distributor and at least a slave unit. The first master unit and the second master unit each comprises a controller embodied to generate telegrams, the telegrams each comprising a control data block with an individual identifier and a user data block.

The first distributor comprises switching device, a first transmitting/receiving device and a second transmitting/receiving device, the switching device being connected to the controller of the first master unit and the first and second transmitting/receiving devices to transmit the telegrams between the controller of the first master unit, the first transmitting/receiving device and the second transmitting/receiving device after evaluating individual identifiers contained in the telegrams on the basis of a first switching control set defined in the switching device. The second distributor comprises a switching device, a first transmitting/receiving device and a second transmitting/receiving device, the switching device being connected to the controller of the second master unit and the first and second transmitting/receiving device to transmit the telegrams between the controller of the second master unit, the first transmitting/receiving device and the second transmitting/receiving device after evaluating individual identifiers contained in the telegrams on the basis of the second switching control set defined in the switching device.

The first transmitting/receiving device of the first distributor and of the second distributor are connected via the ring-shaped data bus in order to transmit telegrams between the first transmitting/receiving devices of the first distributor and of the second distributor. The second transmitting/receiving devices of the first distributor and of the second distributor are connected via the ring-shaped data bus in order to transmit telegrams between the second transmitting/receiving device of the first distributor and of the second distributor. The slave unit comprises a processing device, a first transmitting/receiving device and a second transmitting/receiving device wherein the processing device is connected to the first transmitting/receiving device and the second transmitting/receiving device and is embodied to process telegrams exchanged between the first transmitting/receiving device and the second transmitting/receiving device and wherein the first transmitting/receiving device is connected to the data bus to exchange telegrams on the data bus with the first transmitting/receiving device of the first distributor, wherein the second transmitting/receiving device is connected to the data bus in order to exchange telegrams on the data bus with the first transmitting/receiving device of the second distributor.

In a first operating mode, the first switching control set defined in the switching device of the first distributor forwards telegrams received from the first master unit to the first transmitting/receiving device, the first switching control set defined in the switching device of the first distributor forwards telegrams received by the second transmitting/receiving device to the first master unit, and the second switching control set defined in the switching device of the second distributor forwards first telegrams received by the first transmitting/receiving device to the second transmitting/receiving device. In a second operating mode, the second switching control set defined in the switching device of the second distributor forwards telegrams received by the second master unit to the second transmitting/receiving device, the second switching control set defined in the switching device of the second distributor forwards telegrams received by the first transmitting/receiving device to the second master unit, and the first switching control set defined in the switching device of the first distributor forwards telegrams received by the second transmitting/receiving device to the first transmitting/receiving device.

According to a second aspect, a method for transmitting telegrams in an automation system having a plurality of subscribers and a ring-shaped data bus is provided, the subscribers having a first master unit, a first distributor, a second master unit, a second distributor and at least a slave unit. The first master unit and the second master unit each comprise a controller which generates telegrams, the telegrams each having a control data block with an individual identifier and a user data block.

The first distributor comprises a switching device, a first transmitting/receiving device and a second transmitting/receiving device, the switching device being connected to the controller of the first master unit and to the first and second transmitting/receiving devices, to transmit the telegrams between the controller of the first master unit, the first transmitting/receiving device and the second transmitting/receiving device after evaluating individual identifiers contained in the telegrams on the basis of a first switching control set defined in the switching device. The second distributor comprises a switching device, a first transmitting/receiving device and a second transmitting/receiving device, the switching device being connected to a controller of the second master unit and the first and second transmitting/receiving device to transmit the telegrams between the controller of the second master unit, the first transmitting/receiving device and the second transmitting/receiving device after evaluating individual identifiers contained in the telegrams on the basis of the second switching control set defined in the switching device.

The first transmitting/receiving device of the first distributor and the second distributor are connected via the ring-shaped data bus in order to transmit telegrams between the first transmitting/receiving devices of the first distributor and of the second distributor. The second transmitting/receiving devices of the first distributor and of the second distributor are connected via the ring-shaped data bus in order to transmit telegrams between the second transmitting/receiving device of the first distributor and of the second distributor. The slave unit comprises a processing device, a first transmitting/receiving device and a second transmitting/receiving device wherein the processing device is connected to the first transmitting/receiving device and the second transmitting/receiving device and is embodied to process telegrams exchanged between the first transmitting/receiving device and the second transmitting/receiving device and wherein the first transmitting/receiving device is connected to the data bus to exchange telegrams on the data bus with the first transmitting/receiving device of the first distributor, wherein the second transmitting/receiving device is connected to the data bus in order to exchange telegrams on the data bus with the first transmitting/receiving device of the second distributor.

In a first operating mode, the first switching control set defined in the switching device of the first distributor forwards telegrams received from the first master unit to the first transmitting/receiving device the first switching control set defined in the switching device of the first distributor forwards telegrams received by the second transmitting/receiving device to the first master unit, and the second switching control set defined in the switching device of the second distributor forwards first telegrams received by the first transmitting/receiving device to the second transmitting/receiving device. In a second operating mode, the second switching control set defined in the switching device of the second distributor forwards telegrams received by the second master unit to the second transmitting/receiving device, the second switching control set defined in the switching device of the second distributor forwards telegrams received by the first transmitting/receiving device to the second master unit, and the first switching control set defined in the switching device of the first distributor forwards telegrams received by the second transmitting/receiving device to the first transmitting/receiving device.

According to a third aspect, an automation system comprises a plurality of subscribers. The subscribers comprise a first master unit, a first distributor, a second master unit, a second distributor and at least a slave unit. First transmitting/receiving devices of the first distributor and of the second distributor are connected via a ring-shaped data bus. Second transmitting/receiving devices of the first distributor and the second distributor are connected via the ring-shaped data bus. In a first mode of operation, the first distributor forwards telegrams received from the first master unit to the first transmitting/receiving device. Furthermore, the first distributor forwards telegrams received by the second transmitting/receiving device to the first master unit, and the second distributor forwards first telegrams received by the first transmitting/receiving device to the second transmitting/receiving device. In a second mode of operation, the second distributor forwards telegrams received by the second master unit to the second transmitting/receiving device, the second distributor forwards telegrams received by the first transmitting/receiving device to the second master unit, and the first distributor also forwards telegrams received by the second transmitting/receiving device to the first transmitting/receiving device.

EXAMPLES

The first master unit and the second master unit each comprise a controller embodied to generate telegrams, the telegrams each comprising a control data block with an individual identifier and a user data block.

The first distributor comprises a switching device, a first transmitting/receiving device and a second transmitting/receiving device, wherein the switching device is connected to the controller of the first master unit and the first and second transmitting/receiving device to transmit the telegrams between the controller of the first master unit, the first transmitting/receiving device and the second transmitting/receiving device after evaluating individual identifiers contained in the telegrams based on the first switching control set defined in the switching device.

The second distributor comprises a switching device, a first transmitting/receiving device and a second transmitting/receiving device, the switching device being connected to a controller of the second master unit and the first and second transmitting/receiving devices in order to transmit the telegrams between the controller of the second master unit, the first transmitting/receiving device and the second transmitting/receiving device after evaluating the individual identifier contained in the telegrams on the basis of a second switching control set defined in the switching device.

The first transmitting/receiving devices of the first distributor and the second distributor are connected via the ring-shaped data bus to transmit telegrams between the first transmitting/receiving devices of the first distributor and the second distributor. Furthermore, the second transmitting/receiving devices of the first distributor and the second distributor are connected via the ring-shaped data bus to transmit telegrams between the second transmitting/receiving devices of the first distributor and the second distributor.

The slave unit comprises a processing unit, a first transmitting/receiving device and a second transmitting/receiving device, wherein the processing unit is connected to the first transmitting/receiving device and the second transmitting/receiving device and is embodied to process telegrams exchanged between the first transmitting/receiving device and the second transmitting/receiving device, and wherein the first transmitting/receiving device is connected to the data bus to exchange telegrams on the data bus with the first transmitting/receiving device of the first distributor, wherein the second transmitting/receiving device is connected to the data bus to exchange telegrams on the data bus with the first transmitting/receiving device of the second distributor.

In a first mode of operation, the first switching control set defined in the switching device of the first distributor forwards telegrams received by the first master unit to the first transmitting/receiving device. Furthermore, the first switching control set defined in the switching device of the first distributor forwards telegrams received by the second transmitting/receiving device to the first master unit. Furthermore, the second switching control set defined in the switching device of the second distributor forwards first telegrams received by the first transmitting/receiving device to the second transmitting/receiving device.

In a second operating mode, the second switching control set defined in the switching device of the second distributor forwards telegrams received from the second master unit to the second transmitting/receiving device. Furthermore, the second switching control set defined in the switching device of the second distributor forwards telegrams received from the first transmitting/receiving device to the second master unit. Furthermore, the first switching control set defined in the switching device of the first distributor forwards telegrams received from the second transmitting/receiving device to the first transmitting/receiving device.

This embodiment of the master-slave automation system makes it possible, with little additional hardware involved, for the telegram transmission path to be automatically reconfigured in real time when switching between two operating modes, for example due to the failure of the master unit currently responsible for controlling the automation system. The fault-tolerance functionality is provided by the two distributors additionally provided in the automation system or by their pre-stored switching control sets, which independently switch from one master unit to the other master unit.

The data bus may comprise a first communication path and a second communication path, wherein the first transmitting/receiving device of the first distributor and the second distributor are respectively connected to the first communication path and the second communication path of the data bus to transmit telegrams on the first communication path and the second communication path of the data bus. The first transmitting/receiving device of the slave unit is connected to the first communication path and the second communication path of the data bus to exchange telegrams on the first communication path and the second communication path of the data bus with the first transmitting/receiving device of the first distributor. The second transmitting/receiving device of the slave unit is connected to the first communication path and the second communication path of the data bus to exchange telegrams on the first communication path and the second communication path of the data bus with the first transmitting/receiving device of the second distributor.

In the first operating mode, the controller of the first master unit generates first telegrams having a first identifier and second telegrams having a second identifier that comprise an identical user data block. The first switching control set defined in the switching device of the first distributor then forwards first telegrams received from the first master unit to the first transmitting/receiving device, and forwards second telegrams received from the first master unit to the second transmitting/receiving device. Furthermore, the first switching control set defined in the switching device of the first distributor forwards second telegrams received from the first transmitting/receiving device and first telegrams received from the second transmitting/receiving device to the first master unit. Furthermore, the second switching control set defined in the switching device of the second distributor forwards second telegrams received from the second transmitting/receiving device to the first transmitting/receiving device. Furthermore, the second switching control set defined in the switching device of the second distributor forwards first telegrams received from the first transmitting/receiving device to the second transmitting/receiving device.

In the second operating mode, the controller of the second master unit generates third telegrams having a third identifier and fourth telegrams having a fourth identifier that have an identical user data block. The second switching control set defined in the switching device of the second distributor forwards third telegrams received from the second master unit to the second transmitting/receiving device, and forwards fourth telegrams received from the second master unit to the first transmitting/receiving device. Furthermore, the second switching control set defined in the switching device of the second distributor forwards third telegrams received from the first transmitting/receiving device and fourth telegrams received from the second transmitting/receiving device to the second master unit. Furthermore, the first switching control set defined in the switching device of the first distributor forwards third telegrams received from the second transmitting/receiving device to the first transmitting/receiving device. Furthermore, the first switching control set defined in the switching device of the first distributor forwards fourth telegrams received from the first transmitting/receiving device to the second transmitting/receiving device.

With the aid of the double-ring topology, it is possible to switch over to telegram transmission on the other communication path when a route error occurs on one communication path, wherein the two distributors additionally provided in the master-slave automation system or their pre-stored switching control sets ensure that telegrams on both communication paths correctly circulate the telegram transmission path even when switching over between the two master units.

The slave unit may further comprise a coupling device embodied to short-circuit the first communication path and the second communication path in the first transmitting/receiving device when an error occurs in the transmission of data to the subscriber connected to the first transmitting/receiving device, and to short-circuit the first communication path and the second communication path in the second transmitting/receiving device when an error occurs in the transmission of data to the subscriber connected to the second transmitting/receiving device.

In the first mode of operation, the first switching control set defined in the switching device forwards first telegrams received from the first transmitting/receiving device and second telegrams received from the second transmitting/receiving device to the first master unit. Furthermore, the second switching control set defined in the switching device of the second distributor forwards second telegrams received from the first transmitting/receiving device to the second transmitting/receiving device.

In the second mode of operation, the first switching control set defined in the switching device of the first distributor forwards third telegrams received from the first transmitting/receiving device to the second transmitting/receiving device. Furthermore, the second switching control set defined in the switching device forwards third telegrams received from the second transmitting/receiving device and fourth telegrams received from the first transmitting/receiving device to the second master unit.

With this embodiment of the automation system having a master-slave structure, automatic reconfiguration of the telegram transmission paths may also be carried out on only one communication path in the double-ring topology if route errors occur. The behavior of the subscribers in the automation system in the case of reconfiguration, i.e. when a route error occurs, does not differ from the behavior in normal operation. The automatic reconfiguration by the two distributors additionally provided in the master-slave automation system or by their pre-stored switching control sets ensures high dynamics during the switching process and thus allows for real-time requirements to be met in the automation system.

When the first operation mode is the standard operation mode, in the first operation mode, the second switching control set defined in the switching device of the second distributor additionally forwards telegrams received from the first transmitting/receiving device to the second master unit.

This procedure ensures that both master units, i.e. also the substitute master unit, always receive the complete telegram traffic so that when switching from the main master unit to the substitute master unit, the substitute master unit may continue the control process in the automation system without delay on the basis of the current status.

The controller of the second master unit may then monitor the standard operating mode to take up the second operating mode if an interruption of the standard operating mode is detected.

This procedure ensures that in the event of a failure of the main master unit, the substitute master unit will start operation without delay in order to continue the control process in the automation system without interruption.

The controller of the second master unit may be further configured to transmit the telegrams received in the second operating mode from the controller of the second master unit to the controller of the first master unit when the standard operating mode is resumed.

This procedure has the effect that the standard operating mode may be resumed without delay, e.g. after the main master unit has been fixed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A shows a first operating mode which serves as the standard operating mode, and FIG. 3B shows a second operating mode which serves as the substitute operating mode.

FIG. 4A shows the first operating mode and FIG. 4B the second operating mode, in each case when a route error occurs.

DETAILED DESCRIPTION

Figure 1:
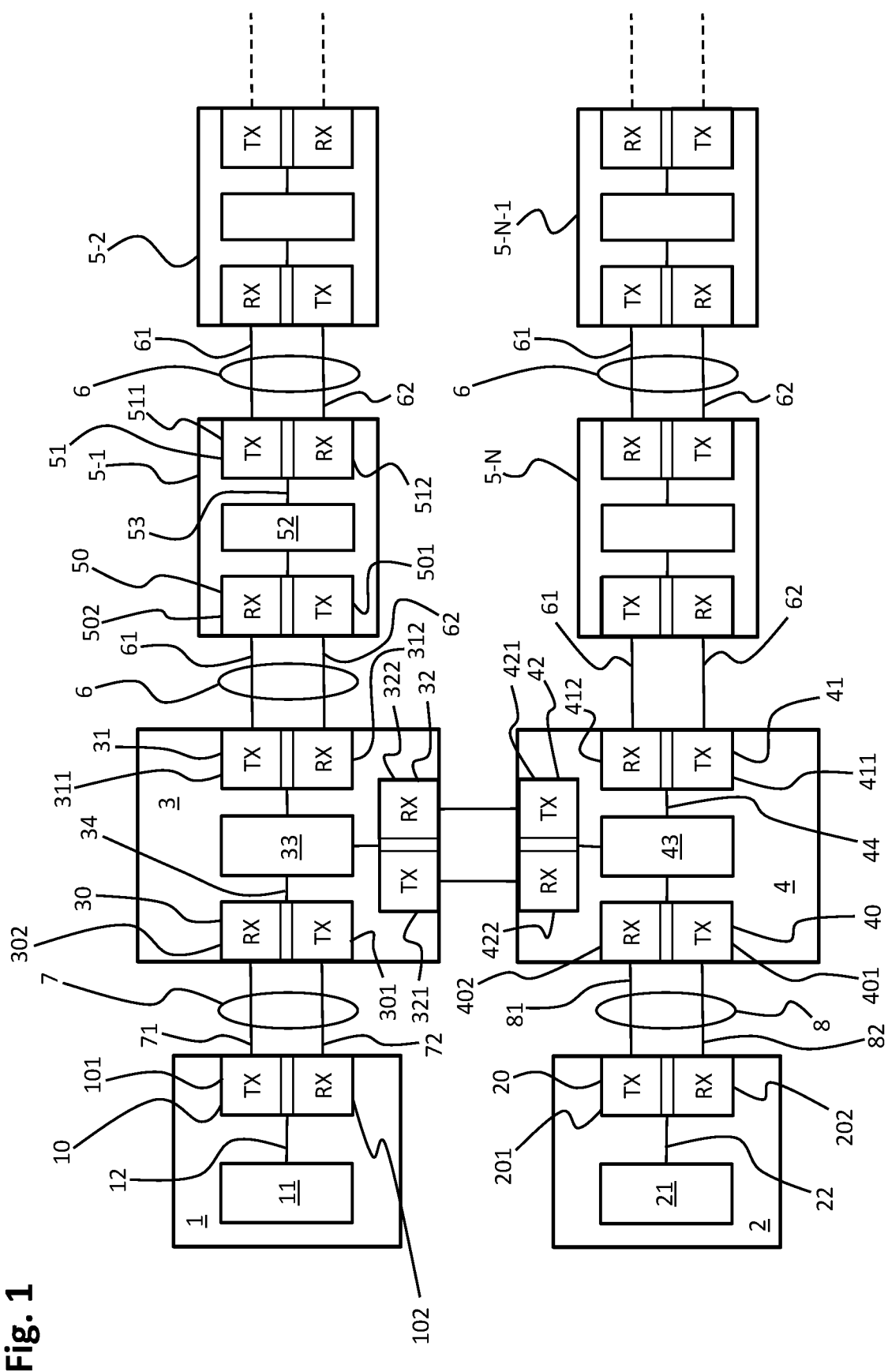
FIG. 1 shows a schematic diagram of a master-slave automation system having a double-ring structure, which comprises a first master unit as the main master unit having a first distributor and a second master unit as the substitute master unit having a second distributor.

In industrial automation, networks are used to connect distributed field devices of a sensor/actuator level to a control level. The automation systems, also referred to as field-bus systems, usually comprise a serial bus to which the network subscribers are connected. Various field bus concepts are used by the manufacturers, which differ in terms of the connection structure, the bus access and the standardized field bus protocol.

The network protocol defines how the data exchange between the subscribers in the network is to be carried out. In doing so, the network protocol determines the rules and formats for the communication behavior of the subscribers. The message structure defined by the network protocol contains all the information important for data exchange, such as sender and recipient, message type, message size and checksum for tracing an error-free transmission. This information is prefixed to the user data in the message as a header or appended as a trailer.

The Ethernet protocol has established itself as the communication standard for short-range networks, especially in automation systems. The Ethernet protocol divides up the data to be transmitted into so-called frames, the structure of which is defined in the IEEE 802.3 standard. The actual Ethernet frame is preceded by a preamble and a start bit, the so-called Start Frame Delimiter SFD. This is followed by the actual Ethernet telegram. The Ethernet telegram consists of a header section, a user data block and an end section, the trailer.

The header starts with a 6-byte field for the target address, followed by another 6-byte field with the source address. Then another 6-byte field, the so-called tag field, may follow with additional control data in the header, which in particular contains prioritization information. The header ends with a 2-byte field, the so-called type field, which provides information on the protocol by which the data in the user data block is to be processed.

The user data block following the header may have a length of 1500 bytes, wherein in different Ethernet protocol extensions also larger data blocks may also be permitted. The user data block may be terminated by the so-called PAD field to guarantee the specified minimum length of the Ethernet frame.

The user data block is followed by the trailer, which has a 6-byte field comprising a checksum. When an Ethernet telegram is created, a CRC calculation is carried out with regard to the bit sequence and the checksum is appended to the data block. The receiver performs the same calculation after receipt. If the received checksum does not match the self-calculated checksum, the receiver assumes a faulty transmission. The Ethernet telegram is then discarded.

The use of the Ethernet standard in industrial automation makes it possible to provide real-time solutions. Real-time capable field bus systems based on the Ethernet standard are e.g. PROFINET, EtherCAT, Powerlink or SERCOS III. The field bus protocol used in each case is displayed as a type-field in the header of the Ethernet frame.

In addition to the Ethernet standard, other field bus protocols such as CANopen, Interbus or Profibus may also be used in automation systems.

Automation systems are usually operated using a master-slave structure. The master unit in the automation system is the controller that has bus access authorization and may output data to the field bus. The slave units in the field bus system are the field devices, such as I/O devices, valves, drives, sensors, transducers, etc. They do not have bus access authorization and may only acknowledge received data and transmit data when requested by the master unit.

In master-slave automation systems, control via an automation system is then usually carried out in such a way that the master unit performs control operations, preferably cyclically, in order to generate output data for slave units and/or other slave units on the basis of input data from these units.

After completion of a control process cycle, the master unit transmits the output data in the form of telegrams on the field bus, wherein the slave unit may take the output data assigned to the respective slave unit from the telegrams and execute a local subscriber process with this output data. The data determined by the local subscriber process is then in turn transmitted by the slave unit to the master unit and then used as input data for the next control process cycle by the master unit.

Automation systems having a master-slave structure are often embodied in such a way that the individual slave units are connected to form a chain via the transmission medium, with each slave unit being connected to two neighbors, and the first and last slave units in the chain being connected to the master unit, resulting in a ring structure. Data is transmitted on the data bus in one direction, starting from the master unit to the first neighboring slave unit and from there to the next up to the last slave unit and then back to the master unit.

In the automation system having a plurality of subscribers connected via a data bus, a plurality of master units may be integrated, which are assigned to the different operating modes. Such an embodiment is particularly suitable for being able, in the event of failure of the master unit, to continue data communication without interruption with the aid of the control process in the master-slave automation system. The second master unit serves as a substitute master unit in the master-slave automation system, which then carries out the telegram traffic with the slave units after the failure of the main master unit.

In order to automatically allow for two operating modes in the master-slave automation system with a small additional hardware outlay, e.g. in order to automatically continue the telegram transmission path with the substitute master unit in the event of a failure of the main master unit currently responsible for controlling the automation system, the two master units are each connected via a distributor with a data bus embodied as a ring structure. The two distributors each have a switching device connected to a controller of the associated master unit.

The controller of the master unit is embodied to generate telegrams each comprising a control data block with an individual identifier and a user data block. The two distributors further each comprise a first transmitting/receiving device and a second transmitting/receiving device, which are connected to the switching device in the distributor. The first transmitting/receiving device and the second transmitting/receiving device of the distributor are identically constructed. The designation of the transmitting/receiving device as the first transmitting/receiving device and the second transmitting/receiving device of the distributor are selected in such a way that a first or second switching control set, which is defined in the switching device of the first or second distributor, respectively, always forwards telegrams generated by the associated first or second master unit, respectively, to the first transmitting/receiving device in order to output the telegrams on the data bus connected to the first transmitting/receiving device.

The master unit and the associated distributor may be embodied as separate components. In this case, a telegram transmission device is connected between the controller of the master unit and the switching device of the distributor, consisting of a transmitting/receiving device assigned to the master unit and a transmitting/receiving device assigned to the distributor, which are connected to each other via a data bus. The transmitting/receiving device assigned to the master unit is connected to the controller of the master unit via an internal data link. A conventional master unit without additional hardware may thus be used as the master unit, which is implemented on an industrial PC, for example. The distributor is then implemented as an additional component for the master unit, with the transmitting/receiving device assigned to the distributor being connected to the switching device of the distributor with an internal data link. However, it is also possible to integrate the master unit and the distributor into a single component, with the controller of the master unit and the switching device of the distributor then being directly connected to each other via an internal data link. The component may e.g. be implemented as an application-specific integrated circuit (ASIC).

The first transmitting/receiving devices and the second transmitting/receiving devices of the two distributors are each connected to one another via the ring-shaped data bus in order to transmit telegrams on the data bus. The slave units are connected in the ring-shaped data bus between the two distributors.

Each slave unit comprises a processing unit, a first transmitting/receiving device and a second transmitting/receiving device, the processing unit being connected to the first transmitting/receiving device and to the second transmitting/receiving device and embodied to process telegrams exchanged between the first transmitting/receiving device and the second transmitting/receiving device. The first transmitting/receiving device and the second transmitting/receiving device of the slave unit are each connected to the ring-shaped data bus for exchanging telegrams on the data bus with the first transmitting/receiving device and the second transmitting/receiving device of the first and the second distributor, respectively.

It is further assumed that the first transmitting/receiving device of at least one slave unit is connected to the first transmitting/receiving device of the first distributor via the data bus in order to receive telegrams on the data bus from the first transmitting/receiving device of the first distributor. It is further assumed that the second transmitting/receiving device of the at least one slave unit is connected to the first transmitting/receiving device of the second distributor via the data bus in order to forward telegrams to the first transmitting/receiving device of the second distributor after a data exchange with the processing unit when passing through the slave unit on the data bus. In principle, however, it is possible for slave units to be arranged in the data bus both between the first transmitting/receiving devices of the two distributors and between the second transmitting/receiving devices of the two distributors.

In a first mode of operation, the first switching control set defined in the switching device of the first distributor forwards telegrams received from the first master unit to the first transmitting/receiving device. Furthermore, the first switching control set defined in the switching device of the first distributor forwards telegrams received from the second transmitting/receiving device to the first master unit. Furthermore, the second switching control set defined in the switching device of the second distributor forwards first telegrams received from the first transmitting/receiving device to the second transmitting/receiving device.

In a second operating mode, the second switching control set defined in the switching device of the second distributor forwards telegrams received from the second master unit to the second transmitting/receiving device. Furthermore, the second switching control set defined in the switching device of the second distributor forwards telegrams received from the first transmitting/receiving device to the second master unit. Furthermore, the second switching control set defined in the switching device of the first distributor forwards telegrams received from the second transmitting/receiving device to the first transmitting/receiving device.

The two additional distributors provided in the automation system, or their pre-stored switching control sets, ensure that regardless of whether the telegrams in the automation system are generated by the first master unit or the second master unit, the telegrams circulate on the data bus and are processed by all slave units connected to the data bus. The reconfiguration of the telegram transmission path when switching from one master unit to the other master unit, e.g. due to the failure of the master unit currently responsible for controlling the automation system, takes place automatically in real time.

To ensure high fault tolerance, especially in the event of route errors in the automation system, i.e., in the event of failure of entire transmission sections with slave units, e.g. due to line breakage, master-slave automation systems also often comprise a second substitute communication path that connects the master units with the slave units to form a further ring structure.

The data bus then comprises a first communication path and a second communication path, wherein the first transmitting/receiving devices of the first distributor and the second distributor are respectively connected to the first communication path and the second communication path of the data bus to transmit telegrams on the first communication path and the second communication path of the data bus.

The first transmitting/receiving device of the at least one slave unit is connected to the first communication path and the second communication path of the data bus to exchange telegrams on the first communication path and the second communication path of the data bus with the first transmitting/receiving device of the first distributor. The second transmitting/receiving device of the slave unit is connected to the first communication path and the second communication path of the data bus to exchange telegrams on the first communication path and the second communication path of the data bus with the first transmitting/receiving device of the second distributor.

In the first operating mode, the controller of the first master unit generates first telegrams having a first identifier and second telegrams having a second identifier that comprise an identical user data block. The first switching control set defined in the switching device of the first distributor then forwards first telegrams received from the first master unit to the first transmitting/receiving device, and forwards second telegrams received from the first master unit to the second transmitting/receiving device. Furthermore, the first switching control set defined in the switching device of the first distributor forwards second telegrams received from the first transmitting/receiving device and first telegrams received from the second transmitting/receiving device to the first master unit.

Furthermore, the second switching control set defined in the switching device of the second distributor forwards second telegrams received from the second transmitting/receiving device to the first transmitting/receiving device. Furthermore, the second switching control set defined in the switching device of the second distributor forwards first telegrams received from the first transmitting/receiving device to the second transmitting/receiving device.

In the second operating mode, the controller of the second master unit generates third telegrams having a third identifier and fourth telegrams having a fourth identifier that comprise an identical user data block. The second switching control set defined in the switching device of the second distributor forwards third telegrams received from the second master unit to the second transmitting/receiving device, and forwards fourth telegrams received from the second master unit to the first transmitting/receiving device. Furthermore, the second switching control set defined in the switching device of the second distributor forwards third telegrams received from the first transmitting/receiving device and fourth telegrams received from the second transmitting/receiving device to the second master unit. Furthermore, the first switching control set defined in the switching device of the first distributor forwards third telegrams received from the second transmitting/receiving device to the first transmitting/receiving device. Furthermore, the first switching control set defined in the switching device of the first distributor forwards fourth telegrams received from the first transmitting/receiving device to the second transmitting/receiving device.

With the aid of the double-ring topology, it is possible to switch over to telegram transmission on the other communication path if a route error occurs on one communication path, wherein the two distributors additionally provided in the master-slave automation system or their pre-stored switching control sets ensure that telegrams on both communication paths also circulate correctly along the telegram transmission path when switching over between the two master units. The fact that the master units always circulate two telegrams with an identical user data block reliably ensures that even if one communication path in the data bus fails, a telegram always passes through all the slave units on the data bus and is interpreted and processed by the processing units in the slave units. The master unit therefore receives back at least one telegram that has been completely processed by all slave units on the data bus. In the case that both telegrams have been completely processed by all slave units on the data bus, the master unit may discard one of the two telegrams.

In order to automatically reconfigure the telegram transmission paths even when route errors occur on only one communication path in the double ring topology, the slave units each further comprise a coupling device which is embodied to short-circuit the first communication path and the second communication path in the first transmitting/receiving device when an error occurs in the transmission of data to the subscriber connected to the first transmitting/receiving device, and to short-circuit the first communication path and the second communication path in the second transmitting/receiving device when an error occurs in the transmission of data to the subscriber connected to the second transmitting/receiving device.

In the first mode of operation, the first switching control set defined in the switching device forwards first telegrams received from the first transmitting/receiving device and second telegrams received from the second transmitting/receiving device to the first master unit. Furthermore, the second switching control set defined in the switching device of the second distributor forwards second telegrams received from the first transmitting/receiving device to the second transmitting/receiving device.

In the second mode of operation, the first switching control set defined in the switching device of the first distributor forwards third telegrams received from the first transmitting/receiving device to the second transmitting/receiving device. Furthermore, the second switching control set defined in the switching device of the second distributor forwards third telegrams received from the second transmitting/receiving device and fourth telegrams received from the second transmitting/receiving device to the second master unit.

With this embodiment of the master-slave automation system, automatic reconfiguration of the telegram transmission paths is performed in the event of a route error on a communication path in the double-ring topology. The behavior of the subscribers in the automation system in the reconfiguration case does not differ from the behavior in normal operation. The automatic reconfiguration by the two distributors additionally provided in the master-slave automation system or their pre-stored switching control sets ensures high dynamics during the switching process and thus allow for real-time requirements to be met in the automation system.

The coupling device in the slave unit is embodied in such a way that all telegrams short-circuit the first communication path and the second communication path in the respective transmitting/receiving device when a data transmission error occurs to the subscriber connected to the first or second transmitting/receiving device. This ensures that the telegrams may be interpreted and processed by the processing unit of the slave unit.

The control unit of the first or second master unit may additionally comprise a counter field set to a predetermined value in the two telegrams with an identical user data block. The processing unit of each slave unit then changes the value of the counter field by a predetermined value as the telegram passes through. The control unit of the first or second master unit then evaluates the value of the counter fields of the two telegrams circulated on the data bus to determine whether all slave units connected to the data bus have processed the respective telegram. By correlating the values in the counter fields of the two telegrams received, it is also possible to determine between which slave units a route error has occurred in the communication path of the data bus, or whether or where a slave unit has failed completely.

Preferably, the counter fields of the two circulating telegrams received on the first and second communication paths are evaluated by adding up the counter field values. The total value then indicates whether all connected slave units are active, since their number is directly reflected in the sum value.

The error tolerance of the master-slave automation system is further improved if, in a read operation, i.e. when the slave units are to transmit data to the master unit, the two telegrams with the identical user data block circulate in opposite directions on the first and second communication paths, with the slave units writing data into the user data block as the respective telegram passes through. The controller of the master unit then ORs the user data blocks of the two telegrams circulated on the first communication path and the second communication path.

This procedure ensures reliable read operation in the master-slave automation system in a simple manner, in particular also in the case of reconfiguration, if the telegram transmission paths in slave units are changed due to a route error by short-circuiting the first communication path and the second communication path and individual subscribers have switched to error operation. By the ORing of the user data blocks of the two received telegrams, a combined user data block is generated, in which all data to be transmitted by the slave units are contained, regardless of how the telegrams are fed back to the master unit via the first and second communication paths.

FIG. 1 schematically shows the possible structure of a fault-tolerant master-slave automation system with a double ring embodiment of the data bus. The master-slave automation system has a first master unit 1, hereinafter also referred to as the main master unit, and a second master unit 2, hereinafter also referred to as the substitute master unit, a first distributor 3, a second distributor 4 and a plurality of N slave units 5, numbered as slave units 5-1, 5-2, . . . 5-N−1, 5-N.

The main master unit 1 and the substitute master unit 2 have the same structure. The main master unit 1 has a transmitting/receiving device 10, also referred to as port_P0 in the following, which comprises a transmitting unit TX 101 and a receiving unit RX 102. Furthermore, the master unit 1 includes a controller 11 connected to port_P0 10 via a data link 12. The substitute master unit 2 comprises a transmitting/receiving device 20, hereinafter also referred to as port_P0, which comprises a transmitting unit TX 201 and a receiving unit RX 202. Furthermore, the substitute master unit 2 comprises a controller 21 that is connected to port_P0 20 via a data link 22.

The first distributor 3 and the second distributor 4 also have the same structure. The first distributor 3 has a master transmitting/receiving device 30, referred to as port_P0 in the following, which comprises a transmitting unit TX 301 and a receiving unit RX 302, a first transmitting/receiving device 31, referred to as port_P1 in the following, which comprises a transmitting unit TX 311 and a receiving unit RX 312, and a second transmitting/receiving device 32, referred to as port_P2 in the following, which comprises a transmitting unit TX 321 and a receiving unit RX 322. Furthermore, a switching device 33 is provided, which is connected to port_P0 30, port_P1 31 and port_P2 32 via an internal data link 34. The second distributor 4 has a master transmitting/receiving device 40, hereinafter also referred to as port_P0, which comprises a transmit unit TX 401 and a receive unit RX 402, a first transmitting/receiving device 41, hereinafter referred to as port_P1, which comprises a transmit unit TX 411 and a receive unit RX 412, and a second transmitting/receiving device 42, hereinafter also referred to as port_P2, which comprises a transmit unit TX 421 and a receive unit RX 422. Furthermore, a switching device 43 is provided, which is connected to port_P0 40, port_P1 41 and port_P2 42 via an internal data link 44.

The master-slave automation system further has a slave data bus 6 with two unidirectional communication paths, referred to as first communication path 61 and second communication path 62. The slave data bus 6 serially interconnects the first distributor 3, the slave units 5-1, 5-2, . . . 5-N−1, 5-N and the second distributor 4.

The first distributor 3 is connected via the TX 311 transmitting unit of port_P1 31 to the first communication path 61 as a telegram coupling-out point and via the RX 312 receiving unit of port_P1 31 to the second communication path 62 as a telegram coupling point. Furthermore, the second distributor 4 is connected via the TX 411 transmitting unit of port_P1 41 to the second communication path 62 as a telegram coupling-out point and via the RX 412 receiving unit of port_P1 41 to the first communication path 61 as a telegram coupling-in point.

The transmitting unit TX 321 of port_P2 32 of the first distributor 3 is connected to the receiving unit RX 422 of port_P2 42 of the second distributor 4 via the second communication path 62. Furthermore, the receiving unit RX 322 of port_P2 32 of the first distributor 3 is connected to the transmitting unit TX 421 of port_P2 42 of the second distributor 4 via the first communication path 61.

Port_P0 10 of the main master unit 1 is connected to port_P0 30 of the first distributor 1 via a main data bus 7. Here, the transmitting unit TX 101 of port_P0 10 of the main master unit 1 is connected to the receiving unit RX 302 of port_P0 30 of the first distributor 3 via a first unidirectional communication path 71. Furthermore, the receiving unit RX 102 of port_P0 10 of the main master unit 1 is connected to the transmitting unit TX 301 of port_P0 30 of the first distributor 3 via a second unidirectional communication path 72.

Port_P0 20 of the substitute master unit 2 is connected to port_P0 40 of the second distributor 4 via a substitute data bus 8. Here, the transmitting unit TX 201 of port_P0 20 of the substitute master unit 2 is connected to the receiving unit RX 402 of port_P0 40 of the second distributor 4 via a first unidirectional communication path 81. Furthermore, the receiving unit RX 202 of port_P0 20 of the substitute master unit 2 is connected to the transmitting unit TX 401 of port_P0 40 of the second distributor 4 via a second unidirectional communication path 82.

The main data bus 7 and the substitute data bus 8 may each be embodied as a branch of the slave data bus 6, which connects the first distributor 3 in a ring with the slave units 5-1, 5-2, . . . 5-N−1, 5-N and the second distributor 4 and then again with the first distributor 3, wherein the two unidirectional communication paths 61, 62 are operated in opposite directions. In principle, however, it is also possible to arrange slave units between the first distributor 3 and the second distributor 4 in the slave data bus.

All slave units 5-1, 5-2, . . . 5-N−1, 5-N have the same structure. The structure of a slave unit 5 is described as an example. The slave unit 5, as viewed from the main master unit 1, has a first transmitting/receiving device 50, hereinafter referred to as port-P1, for connection to a previous subscriber, and a second transmitting/receiving device 51, hereinafter referred to as port_P2, for connecting to the next subscriber. Port_P1 50 comprises a transmitting unit TX 501 and a receiving unit RX 502, wherein the transmitting unit TX 501 of port_P1 50 is connected to the second communication path 62 and the receiving unit RX 502 of port_P1 50 is connected to the first communication path 61. Port_P2 51 comprises a transmitting unit TX 511 and a receiving unit RX 512, wherein the transmitting unit TX 511 of port_P1 51 is connected to the first communication path 61 and the receiving unit RX 512 of port_P1 51 is connected to the second communication path 62. A processing device 52 is connected between port_P1 50 and port_P2 51, which is connected to port_P1 50 and port_P2 51 via an internal data link 53.

Figure 2:
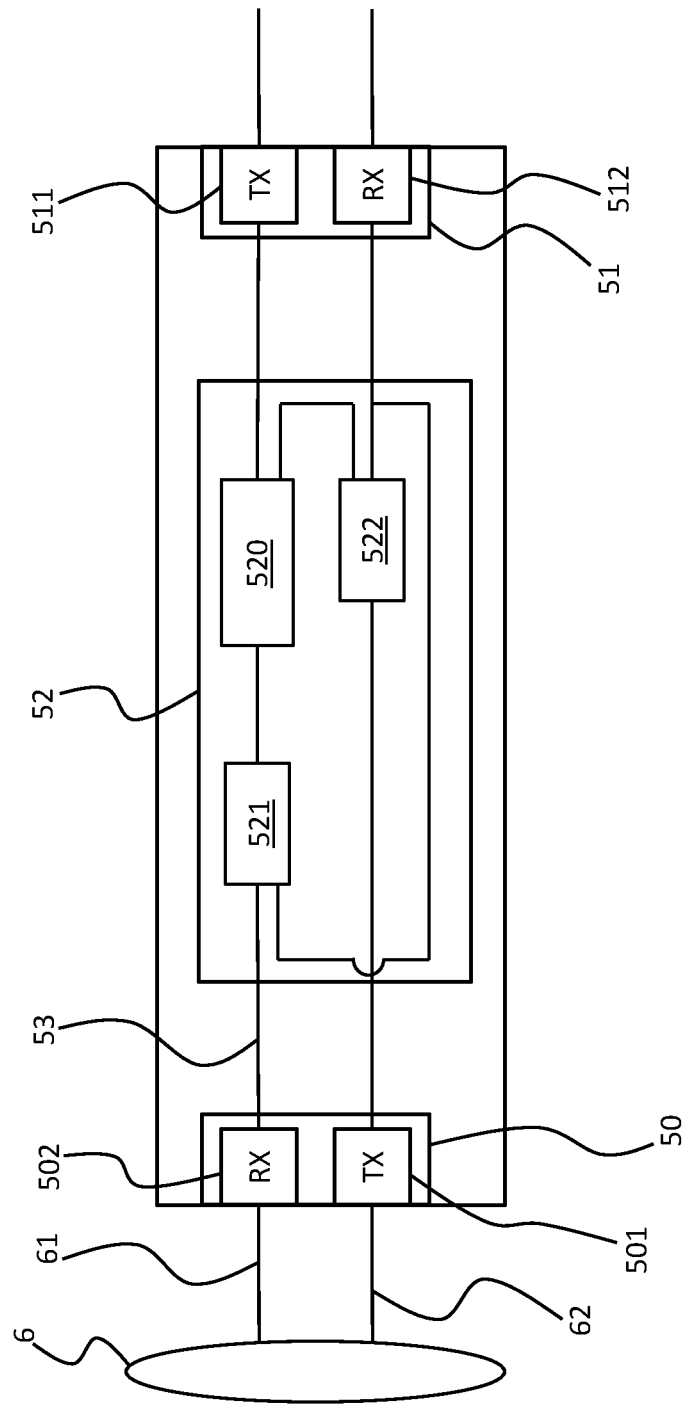
FIG. 2 shows a schematic diagram of the possible structure of a slave unit.

A possible embodiment of a slave unit 5 is shown in FIG. 2. The processing device 52 comprises a telegram processing unit 520 and a coupling device 521 comprising a first changeover switch 5211 and a second changeover switch 5212. The first changeover switch 5211 and the second changeover switch 5212 are each configured as 2-1 multiplexers.

The transmitting unit TX 501 and the receiving unit RX 502 of port_P1 50, the transmitting unit TX 511 and the receiving unit RX 512 of port_P2 51, the first changeover switch 5211, the second changeover switch 5212 and the telegram processing unit 520 are interconnected via the internal data link 53. The RX 502 receiving unit of port_P1 50 is connected to the first input of the first changeover switch 5211 via a data line of the internal data link 53. The second input of the first changeover switch 5211 is connected to the RX 512 receiving unit of port_P2 51 via a data line of the internal data link 53. The output of the first changeover switch 5211 is connected to the telegram processing unit 520 via a data line of the internal data link 53.

The second changeover switch 5212 is connected with its first input to the telegram processing unit 520 via a data line of the internal data link 53 and with its second input to the receiving unit RX 512 of port_P2 51 via a data line of the internal data link 53. The output of the second switch 5212 is connected to the transmitting unit TX 501 of port_P1 50. Furthermore, the telegram processing unit 520 is connected to the transmitting unit TX 511 of port_P2 51 via a data line of the internal data link 53.

With this embodiment of the slave unit 5, a reconfiguration of the telegram transmission paths may be carried out in real time if route errors to neighboring subscribers occur in one or both communication paths, thus ensuring trouble-free operation despite the route error. The embodiment of the slave system shown in FIG. 2 has the advantage that in each slave unit only a single telegram processing unit has to be provided in the processing equipment, which may be used regardless of whether the coupling device with the changeover switches in the slave unit is in normal operation or in fault operation, in which a short circuit occurs between the first communication path and the second communication path, at least one of the two telegrams with an identical user data block, which circulate in opposite directions on the first communication path and the second communication path of the data bus, respectively, always passes through the processing unit. In this way, the hardware effort and thus the costs may be reduced. In addition, the behavior of the slave unit 5 in the redundancy case, i.e. when a path error occurs, does not differ from the behavior in normal operation. At the same time, this ensures high dynamics during the switchover process.

The controller 11 of the main master unit 1 and the substitute master unit 2 have the same structure. The main master unit 1 has a transmitting/receiving device 10, also referred to as port_P0 in the following, which includes a transmitting unit TX 101 and a receiving unit RX 102. Furthermore, the master unit 1 includes a controller 11 connected to port_P0 10 via a data link 12. The substitute master unit 2 comprises a transmitting/receiving device 20, further referred to as port_P0, which comprises a transmitting unit TX 201 and a receiving unit RX 202. Furthermore, the substitute master unit 2 includes a controller 21 that is connected to port_P0 20 via a data link 22.

The master-slave automation system shown in FIG. 1 is controlled by the main master unit 1 in a first operating mode, which is the standard operating mode. In a second operating mode, which is the substitute operating mode, control is provided by the substitute master unit 2.

Within the framework of the control process, the controller of the respective master unit, in standard operating mode the controller 11 of the main master unit 1 and in substitute operating mode the controller 21 of the substitute master unit 2, generates telegrams with an identifier which is used to identify the respective master unit. The master unit may thereby provide all telegrams generated by the master unit with the same identifier.

In the case of a double-ring structure of the data bus, as shown in FIG. 1, the controller of the master unit controlling the telegram traffic always generates two telegrams with the same user data block, wherein the two telegrams have different identifiers which, however, individually identify the master unit generating the telegrams. The telegram identifier is preferably entered in the header of the telegram. In the case of an Ethernet telegram, the tag field for additional control data may be used to enter the identifier. The telegram identifier may also be contained in the source address of the Ethernet telegram.

For controlling the telegram transfer, the switching unit 33 of the first distributor 3 and the switching unit 43 of the second distributor 4 have a first and a second switching control, respectively, also referred to as transfer table in the following. In the transfer table, the telegram identifiers assigned by the main master unit 1 or the substitute master unit 2 are listed, if necessary several times, wherein two port identifiers are assigned to each listed telegram identifier, namely the port of the distributor on which telegrams with the telegram identifier are received, hereinafter also referred to as receiving port, and the port of the distributor on which the telegrams are further transmitted, hereinafter also referred to as transmitting port.

When a telegram is received via the RX receiving unit of a port, the switching device of the respective distributor detects the telegram identifier and then forwards the telegram to the TX transmitting unit of the port that is noted in the transfer table for the telegram identifier and the receiving port as transmitting ports.

The transfer table may be stored in a memory of the switching device of the distributor. When the automation system is started up, e.g. the transfer table may be loaded from the master unit assigned to the distributor into the memory of the distributor's switching equipment. It is also possible to program the transfer table directly into the distributor, e.g. via an externally accessible interface.

In the following, it is assumed that the controller 12 of the main master unit 1 generates first telegrams having a first identifier 1 and second telegrams having a second identifier 2 containing an identical user data block. It is furthermore assumed that the controller 21 of the substitute master unit 2 provides third telegrams having a third identifier 3 and fourth telegrams having a fourth identifier 4 containing an identical user data block.

The transfer tables of the first distributor 3 and the second distributor 4 are recorded herein, on the basis of which the telegram transfer in the master-slave automation system shown in FIG. 1 is controlled in the first distributor 3 and the second distributor 4, respectively.

TABLE 1

| Transfer table of the first distributor 3 | | |
|---|---|---|
| Telegram identifier | Receiving port | Transmitting port |
| 1 | P0 | P1 |
| 1 | P2 | P0 |
| 1 | P1 | P0, P2 |
| 2 | P0 | P2 |
| 2 | P1 | P0 |
| 2 | P2 | P0 |
| 3 | P2 | P0, P1 |
| 3 | P1 | P0, P2 |

TABLE 1-continued

Transfer table of the first distributor 3

| Telegram identifier | Receiving port | Transmitting port |
|---|---|---|
| 4 | P1 | P0, P2 |
| 4 | P2 | P0 |

TABLE 2

Transfer table of the second distributor 4

| Telegram identifier | Receiving port | Transmitting port |
|---|---|---|
| 1 | P1 | P0, P2 |
| 1 | P2 | P0 |
| 2 | P2 | P0, P1 |
| 2 | P1 | P0, P2 |
| 3 | P0 | P2 |
| 3 | P1 | P0 |
| 3 | P2 | P1 |
| 4 | P0 | P1 |
| 4 | P2 | P0 |
| 4 | P1 | P0, P2 |

Routing with the aid of the above transfer tables of the first distributor 3 or the second distributor 4, respectively, ensure correct telegram forwarding in the master-slave automation system automatically and irrespective of whether the master-slave automation system is operated in standard operating mode by the main master unit 1 or in standby operating mode by the substitute master unit 2. This also applies when a route error occurs, i.e. when slave units short-circuit the first communication path 61 and the second communication path 62 of the slave data bus 6 due to an interruption in the slave data bus 6.

In the following, the telegram transmissions in the master-slave automation system according to FIG. 1 are described separately for the standard operating mode and the substitute operating mode, wherein the occurrence of a route error is additionally taken into account for both the standard operating mode and the substitute operating mode.

Figure 3A:
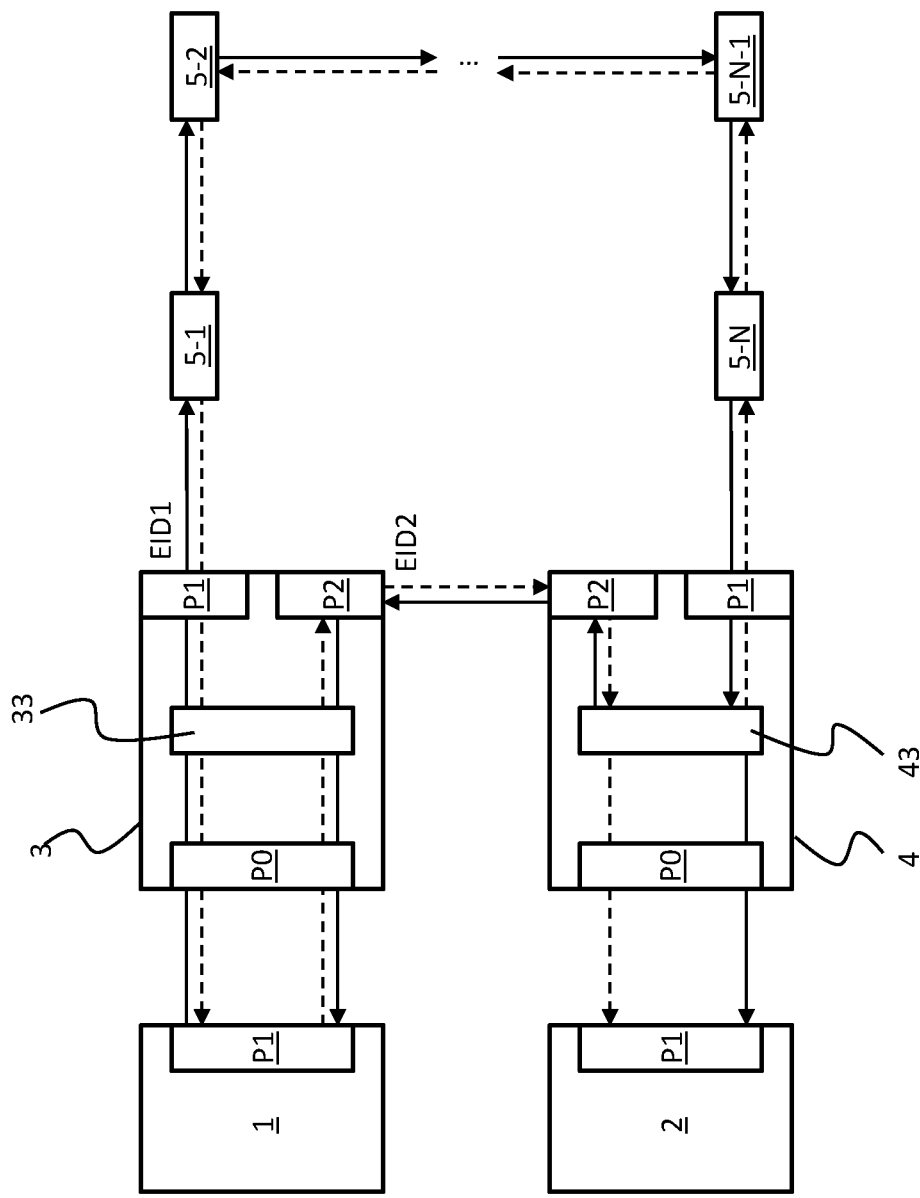
FIGS. 3A and 3B show schematic depictions of the automation system of FIG. 1, where

FIG. 3A shows the standard operating mode in the master-slave automation system according to FIG. 1, wherein the telegram transmission direction in the communication paths is indicated by arrows. As a solid line in FIG. 3A, the transmission path for the first telegrams sent from the main master unit 1 with identifier 1 is shown. The transmission path for the second telegrams having the identifier 2 sent by the main master unit 1 is entered as a dotted line in FIG. 3A.

In the standard operation mode of the master-slave automation system, the first telegram with identifier 1 generated by the controller 11 of the main master unit 1 and the second telegram with identifier 2 generated by the controller 11 of the main master unit 1, which have an identical user data block, are transmitted to port_P0 30 of the first distributor 3 via port_P0 10 on the main data bus 7.

The first telegram with identifier 1 and the second telegram with identifier 2 may be transmitted serially one after the other via the transmitting unit TX 101. Alternatively, it is also possible to carry out parallel transmission if the TX 101 transmitting unit of port_P0 10 of the main master unit 1 and the RX 302 receiving unit of port_P0 30 of the first distributor 3 each have two independent modules.

In the following, the circulation of the first telegram having the identifier 1 starting from the first distributor 3 is described:

After receipt via port_P0 30, the first telegram having the identifier 1 in the first distributor 3 is forwarded to the switching device 33 via the internal data link 34. The switching device 33 of the first distributor 3 detects the telegram identifier and routes the telegram based on the transfer table of the first distributor 3. For clarification, the section of the transfer table of the first distributor 3 for the routing of first telegrams with identifier 1 in standard operating mode is shown again.

TABLE 3

(FIG. 3A): Transfer table of the first distributor 3 in standard operating mode.

| Telegram identifier | Receiving port | Transmitting port |
|---|---|---|
| 1 | P0 | P1 |
| 1 | P2 | P0 |

According to the transfer table, the switching device 33 of the first distributor 3 forwards the first telegram having the identifier 1 received on port_P0 30 via the internal data link 34 to port_P1 31 of the first distributor 3, which outputs the telegram on the first communication path 61 of the slave data bus 6.

The first telegram having the identifier 1 passes through the slave units 5-1 to 5-N arranged on the first communication path 61 one after the other. The first telegram having the identifier 1 is received by port_P1 50 of the slave unit 5 in each case and forwarded to the processing device 52 of the slave unit 5 via the internal data link 53. The telegram processing unit 520 of the processing device 52 interprets the passing first telegram having the identifier 1 and performs a data exchange with the user data block of the telegram. After processing, the first telegram having the identifier 1 is transferred via the internal data link 53 to port_P2 51 of the slave unit 5, which sends the telegram further along the first communication path 61.

Viewed in the transfer direction of the telegram, the last slave unit 5-N on the first communication path 61 of the slave data bus 6 transfers to port_P1 41 of the second distributor 4 after processing the first telegram having identifier 1. After receipt on port_P1 41 of the second distributor 4, the first telegram having identifier 1 in the second distributor 4 is forwarded via the internal data link 44 to the switching device 43, which routes the telegram on the basis of the transfer table stored in the second distributor 4. For clarification, the section of the transfer table of the second distributor 4 for routing first telegrams having the identifier 1 in the standard operating mode is reproduced again.

TABLE 4

(FIG. 3A): Transfer table of the second distributor 4 in standard operating mode.

| Telegram identifier | Receiving port | Transmitting port |
|---|---|---|
| 1 | P1 | P0, P2 |

The first telegram with the first identifier 1 processed by the slave units on the first communication path 61 is routed by the switching device 43 of the second distributor 4 via the internal data link 44 to port_P2 42, via which the first telegram having the identifier 1 is output on the first communication path 61 of the slave data bus 6.

In addition, the switching device 43 of the second distributor 4 forwards the first telegram having the identifier 1 to port_P0 40 via the internal data link 44. Port_P0 40 of the second distributor 4 then transmits the first telegram having the identifier 1 via the substitute data bus 8 to port_P0 20 of the substitute master unit 2.

The first telegram having the identifier 1 output via port_P2 42 of the second distributor 4 is received by port_P2 32 of the first distributor 3 on the first communication path 61 of the slave data bus 6 and is routed by the switching device 33 of the first distributor 3 in accordance with the above section of the transfer table of the first distributor 3 via the internal data link 34 to port_P0 30, which transmits the first telegram having the identifier 1 on the main data bus 7 to port_P0 10 of the main master unit 1.

In the following, the circulation of the second telegram having the identifier 2 starting from the first distributor 3 is described:

After receipt via port_P0 30, the second telegram having the identifier 2 is forwarded in the first distributor 3 via the internal data link 34 to the switching device 33. The switching device 33 of the first distributor 3 then routes the telegram on the basis of the transfer table of the first distributor 3, of which the section of the transfer table of the first distributor 3 for the routing of second telegrams having the identifier 2 in standard operating mode is reproduced here once again.

TABLE 5

(FIG. 3A): Transfer table of the first distributor 3 in standard operating mode.

| Telegram identifier | Receiving port | Transmitting port |
|---|---|---|
| 2 | P0 | P2 |
| 2 | P1 | P0 |

As may be seen from the transfer table, after evaluating the telegram identifier, the switching device 33 of the first distributor 3 forwards the second telegram having the identifier 2 to port_P2 32, which outputs the telegram to the second communication path 62 of the slave data bus 6.

The second telegram with identifier 2 is then received by the second distributor 4 on port_P2 42 and routed by the switching device 43 of the second distributor 4 according to the transfer table. The section of the transfer table of the second distributor 4 for the routing of second telegrams having the identifier 2 in the standard operating mode is reproduced here.

TABLE 6

(FIG. 3A): Transfer table of the second distributor 4 in standard operating mode.

| Telegram identifier | Receiving port | Transmitting port |
|---|---|---|
| 2 | P2 | P0, P1 |

The second telegram with identifier 2 received on port_P2 42 is routed to both port_P0 40 and port_P1 41 by the switching device 43 of the second distributor 4 according to the transfer table via the internal data link 34.

Port_P0 40 of the second distributor 4 then transmits the second telegram with identifier 2 via the substitute data bus 8 to port_P0 20 of the substitute master unit 2.

The second telegram having the identifier 2 is output from port_P1 41 of the second distributor 4 onto the second communication path 62 of the slave data bus 6. The second telegram having the identifier 2 passes successively through the slave units 5-1 to 5-N arranged on the second communication path 62, wherein the second telegram having the identifier 2 circulates in the opposite direction to the first telegram having the identifier 1 on the first communication path 61, i.e. it is forwarded from the slave unit 5-N via the slave unit 5-N–1 to the slave unit 5-1.

In this context, the second telegram having the identifier 2 is received in each case by port_P2 51 of the slave unit 5 and forwarded to the processing device 52 of the slave unit 5 via the internal data link 53. In an embodiment of the slave unit as shown in FIG. 2, in the standard operating mode only the first telegram with telegram identifier 1 circulating on the first communication path 61 of the slave data bus 6 is processed by the telegram processing unit 520 in the processing device 52 of the slave unit 5. In contrast, the second telegram having the identifier 2 circulating on the second communication path 62 of the slave data bus 6 in the opposite direction to the first telegram having the identifier 1 is passed through unprocessed by the slave unit 5.

For this purpose, in the standard operating mode, the first changeover switch 5211 and the second changeover switch 5212 in the coupling device 521 of the processing device 52 are set in such a way that only the first telegram having the identifier 1 received on the first communication path 61 runs via the telegram processing unit 520 of the processing device 52 in order to be processed. In contrast, the second telegram with the second identifier 2 is transmitted directly from port_P2 51 to port_P1 50 by the first switch 5211 and the second switch 5212 in the coupling device 521 on the internal data link 53.

Viewed in the telegram transmission direction, the last slave unit 5-1 on the second communication path 62 of the slave data bus 6 transmits the second telegram having the identifier 2 to port_P1 31 of the first distributor 3. The second telegram with identifier 2 is forwarded to the switching device 33 of the first distributor 3 via the internal data link 34, which routes the telegram to port_P0 30 on the basis of the above transfer table stored in the first distributor 3, from where the second telegram with identifier 2 is fed back on the main data bus 7 to port_P0 10 of the main master unit 1.

After completion of the circulation of the first telegram having the identifier 1 and the second telegram having the identifier 2, both telegrams are identically present in the controller 11 of the main master unit 1 as well as in the controller 21 of the substitute master unit 2. In the standard operating mode of the master-slave automation system, the controller 11 of the main master unit 1 then processes the feedback first telegram having the identifier 1, with which all slave units 5-1 to 5-N have executed a data exchange with the user data block of the telegram.

At the same time, further processing of the first telegram having the identifier 1 also takes place in the controller 21 of the substitute master unit 2. The substitute master unit 2 may then continue the control process in the master-slave automation system based on the current status without delay when switching from the main master unit 1 to the substitute master unit 2, for example, after failure of the main master unit 1.

Figure 3B:
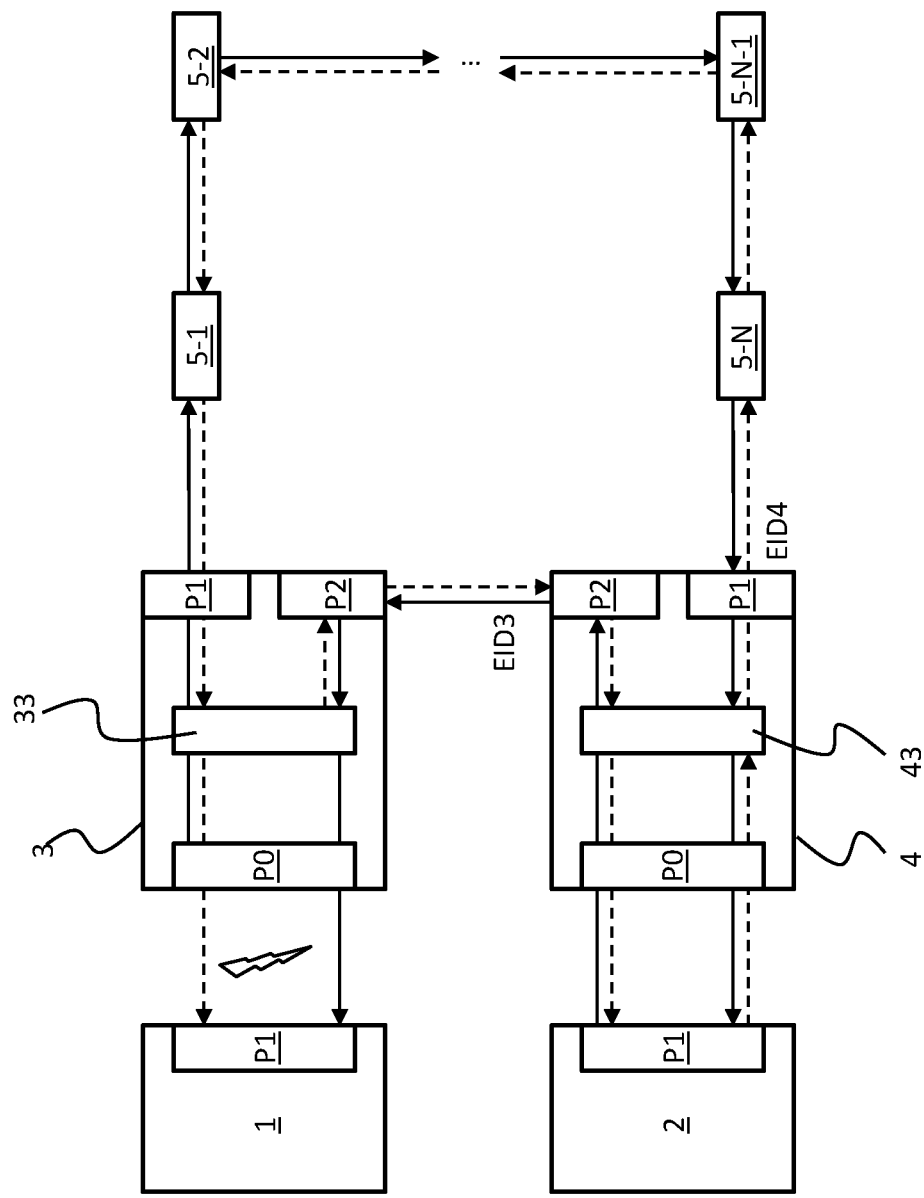

FIG. 3B shows the substitute operating mode in the master-slave automation system according to FIG. 1 after failure of the main master unit 1, in which the substitute master unit 2 controls the telegram traffic in the master-slave automation system. The solid line in FIG. 3B shows the transmission path for the third telegrams with identifier 3 sent by the substitute master unit 2. The transmission path for the fourth telegrams having the identifier 4 sent by the substitute master unit 2 is entered as a dotted line in FIG. 3B.

In the substitute operation mode of the master-slave automation system, the third telegram with identifier 3 generated by the controller 21 of the substitute master unit 2 and the fourth telegram with identifier 4 generated by the controller 21 of the substitute master unit 2, which have an identical user data block, are transmitted to port_P0 40 of the second distributor 4 via port_P0 10 on the substitute data bus 8.

The third telegram with identifier 3 and the fourth telegram with identifier 4 may be transmitted serially one after the other by the transmitting unit TX 201 of port_P0 20 of the substitute master unit 2. Alternatively, it is also possible to carry out parallel transmission if the TX 201 transmitting unit of port_P0 20 of the substitute master unit 2 and the RX 402 receiving unit of port_P0 40 of the second distributor 4 each have two independent modules.

In the following, the circulation of the third telegram having the identifier 3 starting from the second distributor 4 is described:

After being received via port_P0 40, the third telegram having the identifier 3 in the second distributor 4 is forwarded to the switching device 43 via the internal data link 44. The switching device 43 of the third distributor 4 detects the telegram identifier and then routes the telegram using the transfer table of the third distributor 4. For clarification, the section of the transfer table of the third distributor 4 for the routing of third telegrams with identifier in the substitute operating mode is reproduced.

TABLE 7

(FIG. 3B): Transfer table of the second distributor 4 in substitute operating mode.

| Telegram identifier | Receiving port | Transmitting port |
|---|---|---|
| 3 | P0 | P2 |
| 3 | P1 | P0 |

The third telegram with identifier 3 received on port_P0 30 of the second distributor 4 is routed by the switching device 43 of the third distributor 4 according to the transfer table via the internal data link 44 to port_P2 42, which transmits the telegram on the first communication path 61 of the slave data bus 6 to port_P2 32 of the first distributor 3.

After receipt on port_P2 32 of the first distributor 3, the third telegram with identifier 3 in the first distributor 3 is forwarded via the internal data link 34 to the switching device 33, which routes the telegram based on the transfer table stored in the first distributor 3. The following shows the section of the transfer table of the first distributor 3 for routing third telegrams having the identifier 3 in the substitute operating mode.

TABLE 8

(FIG. 3B): Transfer table of the first distributor 3 in substitute operating mode.

| Telegram identifier | Receiving port | Transmitting port |
|---|---|---|
| 3 | P2 | P0, P1 |

The third telegram with identifier 3 received on port_P2 32 is forwarded by the switching device 33 of the first distributor 2 via the internal data link 34 to both port_P0 30 and port_P1 31.

Port_P0 30 of the first distributor 3 then attempts to transmit the third telegram with identifier 3 via the main data bus 7 to port_P0 10 of the main master unit 1. However, since the main master unit 1 has failed, the telegram is not received.

The third telegram having the identifier 3 is output from port_P1 31 of the first distributor 3 to the first communication path 61 of the slave data bus 6. The third telegram having the identifier 3 passes through the slave units 5-1 to 5-N arranged on the first communication path 61 one after the other. The third telegram having the identifier 3 is received in each case by port_P1 50 of the slave unit 5 and sent via the internal data link 53 to the telegram processing unit 520 of the processing device 52, which carries out a data exchange with the user data block of the telegram. After processing, the third telegram having the identifier 3 is transferred via the internal data link 53 to port_P2 51 of the slave unit 5, which then sends the telegram further along the first communication path 61.

Viewed in the telegram transmission direction, the last slave unit 5-N on the first communication path 61 of the slave data bus 6 transmits the third telegram with identifier 3 to port_P1 41 of the fourth distributor 4 after processing. After being received on port_P1 41 of the fourth distributor 4, the third telegram with identifier 3 in the second distributor 4 is forwarded via the internal data link 44 to the switching device 43, which routes the telegram to port_P0 40 based on the preceding transfer table stored in the second distributor 4. The third telegram having the identifier 3 output via port_P0 40 of the second distributor 4 on the substitute data bus 8 is received by port_P0 20 of the substitute master unit 2.

In the following, the circulation of the fourth telegram having the identifier 4 starting from the second distributor 4 is described:

After receipt via port_P0 40, the fourth telegram having the identifier 4 in the second distributor 3 is forwarded to the switching device 43 via the internal data link 44. The switching device 43 of the second distributor 4 then routes the telegram on the basis of the transfer table of the second distributor 4, of which the section of the transfer table of the second distributor 4 for the routing of fourth telegrams having the identifier 4 in the substitute operating mode is reproduced here.

TABLE 9

(FIG. 3B): Transfer table of the second distributor 4 in substitute operating mode

| Telegram identifier | Receiving port | Transmitting port |
|---|---|---|
| 4 | P0 | P1 |
| 4 | P2 | P0 |

As may be seen from the transfer table, after evaluating the telegram identifier, the switching device 43 of the second distributor 4 forwards the fourth telegram having the identifier 4 to port_P1 41, which outputs the telegram on the second communication path 62 of the slave data bus 6.

The fourth telegram having the identifier 4 passes successively through the slave units 5-1 to 5-N arranged in second communication path 62, wherein the fourth telegram having the identifier 4 circulates in the opposite direction to the third telegram having the identifier 3 on first communication path 61 and is passed on from slave unit 5-N, then to slave unit 5-N−1 to slave unit 5-1.

Figure 4A:
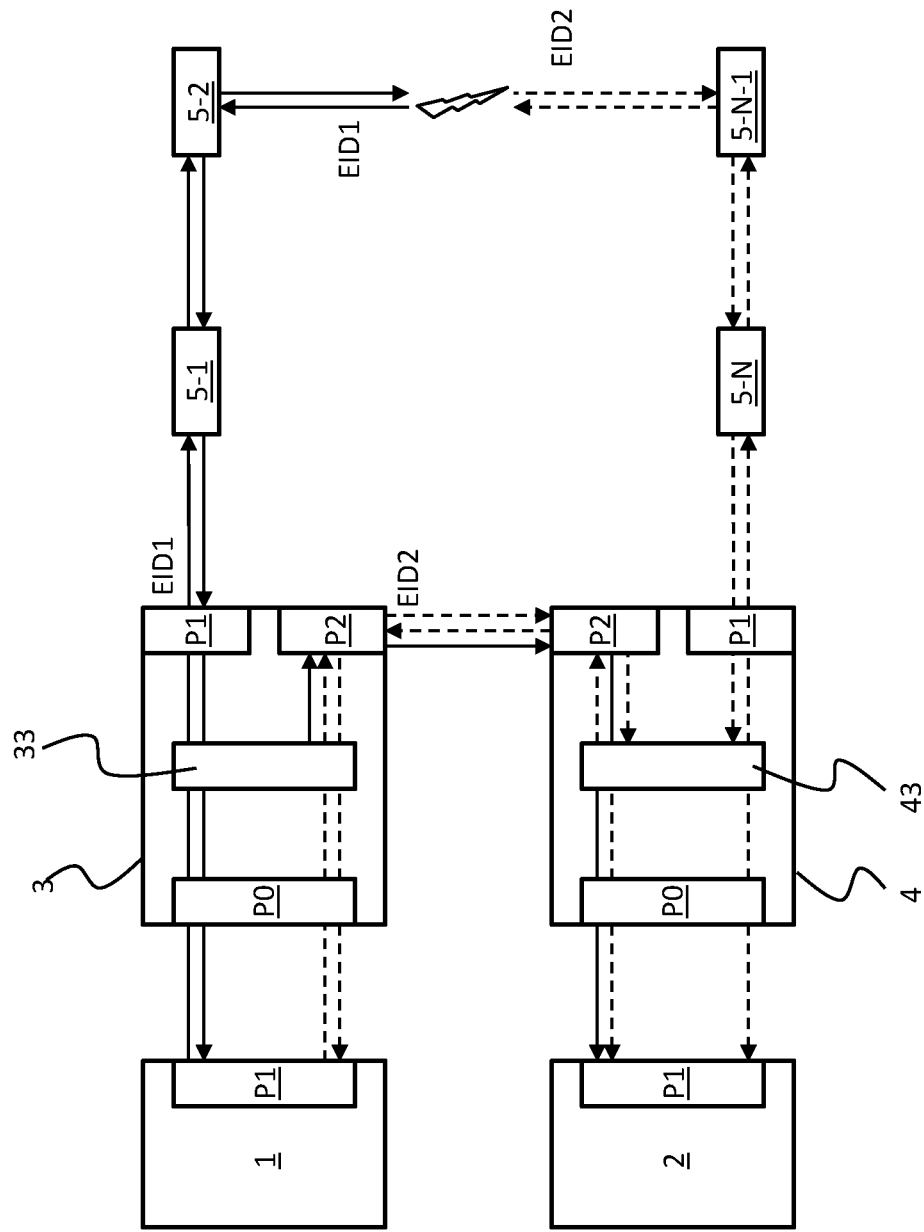
FIGS. 4A and 4B show schematic depictions of the automation system from FIG. 1, where
Figure 4B:
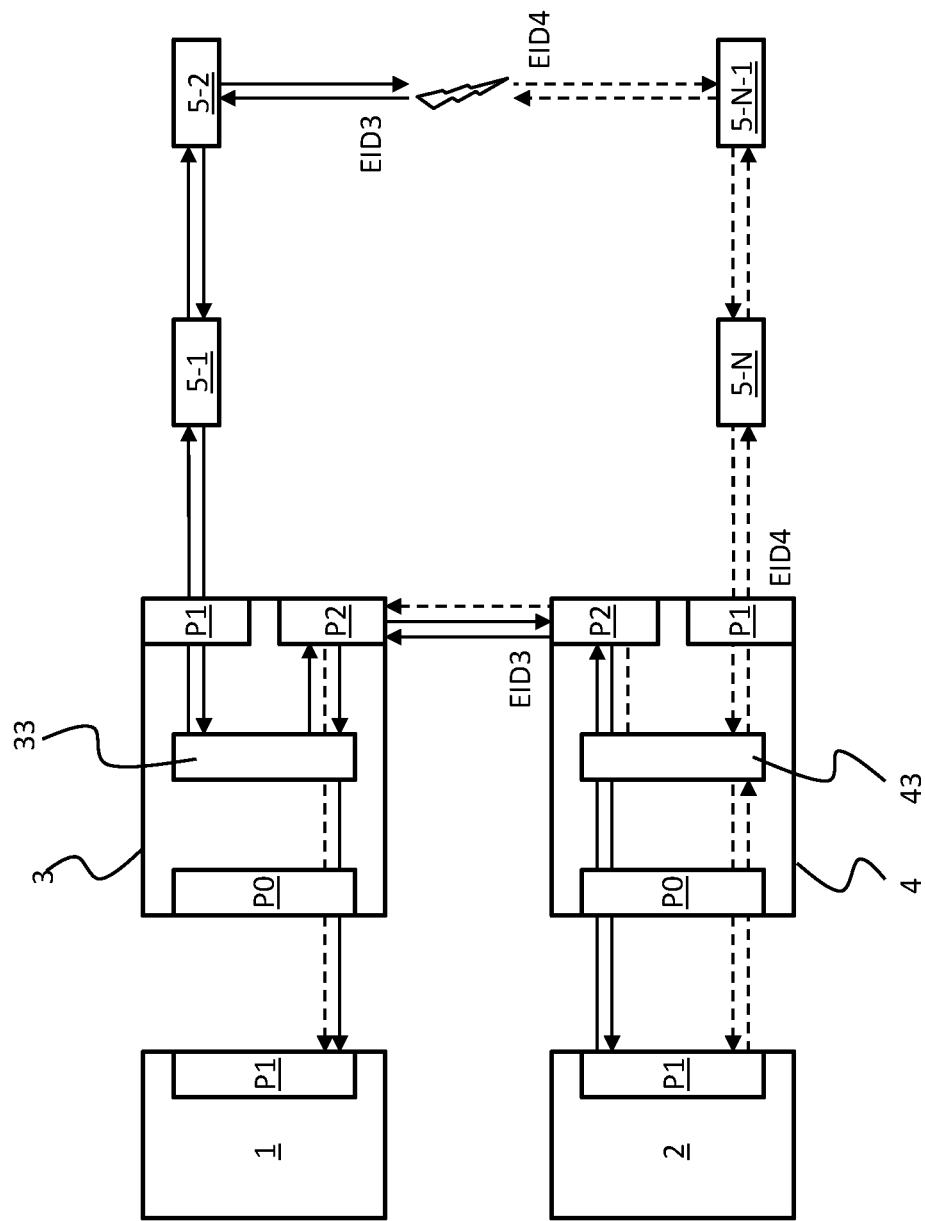

In this context, the fourth telegram having the identifier 4 is received in each case by port_P2 51 of the slave unit 5 and forwarded to the processing device 52 of the slave unit 5 via the internal data link 53. In an embodiment of the slave unit as shown in FIGS. 4A and 4B, only the third telegram with telegram identifier 3 circulating on the first communication path 61 of the slave data bus 6 is processed by the telegram processing unit 520 of the processing device 52 in the slave unit 5 in the substitute operating mode analogous to the standard operating mode. In contrast, the fourth telegram having the identifier 4 circulating on the second communication path 62 of the slave data bus 6 in the opposite direction to the third telegram having the identifier 3 is passed through in an unprocessed manner by the slave unit 5. For this purpose, in the substitute operating mode analogous to the standard operating mode, the first changeover switch 5211 and the second changeover switch 5212 in the coupling device 521 of the processing device 52 are configured in such a way that only the third telegram having the identifier 3 received on the first communication path 61 passes through the telegram processing unit 520 of the processing device 54 to be processed. In contrast, the fourth telegram with the fourth identifier 4 is transmitted directly from port_P2 51 to port_P1 50 by the first switch 5211 and the second switch 5212 on the internal data link 53.

Viewed in the telegram transmission direction, the last slave unit 5-1 on the second communication path 62 of the slave data bus 6 transmits the fourth telegram with identifier 4 to port_P1 31 of the first distributor 3. The fourth telegram with identifier 4 is then forwarded via the internal data link 34 to the switching device 33 of the first distributor 3, which routes the telegram based on the transfer table stored in the first distributor. The following shows the section of the transfer table of the first distributor 3 for routing fourth telegrams having the identifier 4 in the substitute operating mode.

TABLE 10

(FIG. 3B): Transfer table of the first distributor 3 in substitute operating mode.

| Telegram identifier | Receiving port | Transmitting port |
|---|---|---|
| 4 | P1 | P0, P2 |

The fourth telegram having the identifier 4 received on port_P1 31 is routed by the switching device 33 of the first distributor 3 according to the transfer table via the internal data link 34 to both port_P0 30 and port_P2 32.

Port_P0 30 of the first distributor 3 then attempts to transmit the fourth telegram having the identifier 4 via the main data bus 7 to port_P0 10 of the main master unit 1. However, since the main master unit 1 has failed, the telegram is not received.

The fourth telegram having the identifier 4 output via port_P2 32 of the first distributor 3 is received by port_P2 42 of the second distributor 4 on the second communication path 62 of the slave data bus 6 and is routed by the switching device 43 of the second distributor 4 in accordance with the above section of the transfer table of the second distributor 4 via the internal data link 44 to port_P0 40, which transmits the fourth telegram having the identifier 4 on the substitute data bus 8 to port_P0 20 of the substitute master unit 2.

After the circulation of the third telegram having the identifier 3 and the fourth telegram having the identifier 4 is completed, the controller 21 of the substitute master unit 2 then further processes the feedback third telegram having the identifier 3, with which all slave units 5-1 to 5-N have executed a data exchange with the user data block of the telegram, in the substitute operating mode of the master-slave automation system.

The controller 21 of the substitute master unit 2 in the master-slave automation system is embodied to monitor the standard operation mode, in which the controller 11 of the main master unit 1 controls the telegram traffic, to take up from the substitute operation mode when a failure of the main master unit 1 is detected. In this case, the controller 21 of the substitute master unit 2 may take up the telegram traffic without delay, since the controller 21 of the substitute master unit 2 in the standard operation mode has received, in parallel with the main master unit 1, the first telegrams having the identifier 1 fed back after processing by the slave units 5-1 to 5-N, and is thus up to date with the current status of the control operation.

The controller 21 of the substitute master unit 2 is then further set up, when switching back to the standard operation mode, then when the main master unit 1 is active again, to transmit the fourth telegrams having the identifier 4 received in the substitute operation mode from the controller 21 of the substitute master unit 2 and processed by the slave units 5-1 to 5-N to the controller 11 of the main master unit 1. In this way, the controller 11 of the main master unit 1 may seamlessly follow the telegram traffic in the substitute operation mode in the standard operation mode.

FIG. 4A shows the standard operating mode in the master-slave automation system according to FIG. 1, wherein a route error has occurred in the slave data bus 6. When a route error occurs in the slave data bus 6, the master-slave automation system has the capability of automatic reconfiguration to maintain telegram transmission in the automation system. When a route error occurs in the slave data bus 6, the two slave units adjacent to the error location automatically enter an error mode in which the coupling device 521 in the processing device 52 of the slave unit 5 in the embodiment shown in FIG. 2 uses the first changeover switch 5211 and the second changeover switch 5212 to short-circuit the first communication path 61 and the second communication path 62 to divert the telegrams from one communication path to the other communication path.

As in the regular standard operating mode of the master-slave automation system, a first telegram with identifier 1 and a second telegram with identifier 2, which have an identical user data block, are generated by the controller 11 of the main master unit 1 and transmitted to port_P0 30 of the first distributor 3 via port_P0 10 on the main data bus 7.

By short-circuiting the first communication path 61 and the second communication path 62 in the two slave units adjacent to the error location in the slave data bus 6, which is not explicitly shown in FIG. 4A, a loop-shaped telegram transmission takes place via the first communication path 61 and the second communication path 62 of the slave data bus 6. The transmission path for the first telegrams having the identifier 1 sent by the main master unit 1 is shown as a solid line in FIG. 4A. The transmission path for the second telegrams having the identifier 2 sent by the main master unit 1 is entered as a dotted line in FIG. 3A.

The circulation of the first telegram having the identifier 1 starting from the first distributor 3 is described here, where the section of the transfer table of the first distributor 3 for the passage of first telegrams having the identifier 1 in the standard operating mode in the event of a route error is reproduced here.

TABLE 11

(FIG. 4A): Transfer table of the first distributor 3
in standard operating mode in case of a route error.

| Telegram identifier | Receiving port | Transmitting port |
|---|---|---|
| 1 | P0 | P1 |
| 1 | P2 | P0 |
| 1 | P1 | P0, P2 |

After receipt via port_P0 30, the first telegram with identifier 1 in the first distributor 3 is forwarded to the switching device 33 via the internal data link 34. The switching device 33 of the first distributor 3 routes the first telegram having the identifier 1 via the internal data link 34 to port_P1 31 of the first distributor 3 according to the transfer table.

The first telegram with identifier 1 is then output from port_P1 31 of the first distributor 3 on the first communication path 61 of the slave data bus 6. The first telegram with identifier 1 runs through the slave units arranged on the first communication path 61 one after the other until it reaches the slave unit that is adjacent to the route error. The first telegram having the identifier 1 is received in each case by port_P1 50 of the slave unit 5 and is forwarded via the internal data link 53 to the processing device 52 of the slave unit 5, the telegram processing unit 520 of which carries out a data exchange with the passing first telegram having the identifier 1. After processing the telegram, the first telegram having the identifier 1 is then transferred via the internal data link 53 to port_P2 51 of the slave unit 5, which sends the telegram further along the first communication path 61.

In the slave unit adjacent to the route error, the first telegram having the identifier 1, after processing by the telegram processing unit 520, is routed back to port_P1 50 instead of port_P2 51 by a corresponding changeover in the second changeover switch 5212 of the coupling device 521, which outputs the first telegram having the identifier 1 on the second communication path 62. The first telegram with identifier 1 then runs in the opposite direction, without being processed. Furthermore, through the slave units on the second communication path 62 to the first slave unit 5-1.

The first slave unit 5-1 then transfers the first telegram with identifier 1 to port_P1 31 of the first distributor 3. The first telegram with identifier 1 is forwarded via the internal data link 34 to the switching device 33 of the first distributor 3, which routes the telegram to both port_P0 30 and port_P2 32 based on the preceding transfer table stored in the first distributor 3.

Port_P0 30 of the first distributor 3 transmits the first telegram with identifier 1 on the main data bus 7 to port_P0 10 of the main master unit 1.

In addition, port_P2 32 of the first distributor 3 transmits the first telegram having the identifier 1 on the first communication path 61 to port_P2 42 of the second distributor 4. The first telegram having the identifier 1 is forwarded in the second distributor 4 via the internal data link 44 to the switching device 43, which routes the telegram on the basis of the transfer table stored in the second distributor 4, of which the corresponding section of the transfer table of the second distributor 4 for the routing of first telegrams having the identifier 1 in the standard operating mode in the event of a route error is reproduced here.

TABLE 12

(FIG. 4A): Transfer table of the second distributor 4
in standard operating mode in case of a route error.

| Telegram identifier | Receiving port | Transmitting port |
|---|---|---|
| 1 | P2 | P0 |

The switching device 43 of the second distributor 4 forwards the first telegram having the identifier 1 to port_P0 40 via the internal data link 44. Port_P0 40 of the second distributor 4 then transmits the first telegram having the identifier 1 via the substitute data bus 8 to port_P0 20 of the substitute master unit 2.

In the following, the circulation of the second telegram having the identifier 2 starting from the first distributor 3 is described:

After receipt via port_P0 30, the second telegram having the identifier 2 in the first distributor 3 is forwarded to the switching device 33 via the internal data link 34. The switching device 33 of the first distributor 3 then routes the telegram on the basis of the transfer table of the first distributor 3, of which the section of the transfer table of the first distributor 3 for the routing of second telegrams having the identifier 2 in the standard operating mode in the event of a route error is reproduced again.

TABLE 13

(FIG. 4A): Transfer table of the first distributor 3
in standard operating mode in case of a route error.

| Telegram identifier | Receiving port | Transmitting port |
|---|---|---|
| 2 | P0 | P2 |
| 2 | P1 | P0 |
| 2 | P2 | P0 |

As may be seen from the transfer table, after evaluating the telegram identifier of the second telegram with identifier 2, the switching device 33 of the first distributor 3 forwards to port_P2 32, which outputs the telegram to the second communication path 62 of the slave data bus 6.

The second telegram with identifier 2 is then received by the second distributor 4 on port_P2 42 and routed by the switching device 43 of the second distributor 4 according to the transfer table. The section of the transfer table of the second distributor 4 for the routing of second telegrams having the identifier 2 in the standard operating mode in the event of a route error is reproduced here.

TABLE 14

(FIG. 4A): Transfer table of the second distributor 4
in standard operating mode in case of a route error.

| Telegram identifier | Receiving port | Transmitting port |
|---|---|---|
| 2 | P2 | P0, P1 |
| 2 | P1 | P0, P2 |

The second telegram with identifier 2 received on port_P2 42 is routed to both port_P0 40 and port_P1 41 by the switching device 43 of the second distributor 4 according to the transfer table via the internal data link 34.

Port_P0 40 of the second distributor 4 then transmits the second telegram with identifier 2 via the substitute data bus 8 to port_P0 20 of the substitute master unit 2.

The second telegram having the identifier 2 is output from port_P1 41 of the second distributor 4 onto the second communication path 62 of the slave data bus 6. The second telegram having the identifier 2 runs through the slave units arranged on the second communication path 62 one after the other up to the slave unit which is adjacent to the route error, wherein the second telegram having the identifier 2 runs around in the opposite direction to the first telegram having the identifier 1 on the first communication path 61, i.e. outgoing from the slave unit 5-N.

The second telegram having the identifier 2 is received in each case by port_P2 51 of the slave unit 5 and forwarded via the internal data link 53 to the processing device 52 of the slave unit 5, which forwards the second telegram having the identifier 2 in an unprocessed manner through a corresponding setting of the first changeover switch 5211 and the second changeover switch 5212 in the coupling device 521 to port_P1 50, which sends the telegram further along the second communication path 62.

In the slave unit adjacent to the link fault, however, the second telegram having the identifier 2 is forwarded, instead of to port_P1 50, by a corresponding changeover in the first changeover switch 5211 of the coupling device 521 to the telegram processing unit 520 in the processing device 52, which carries out a data exchange with the user data block of the telegram.

After processing of the second telegram with identifier 2 by telegram processing unit 520 in processing device 52, the telegram is then transferred via internal data link 53 to port_P2 51 of slave unit 5, which sends the telegram back to second distributor 4 on first communication path 61 in opposite direction to telegram receiving direction.

The second telegram having the identifier 2 then passes through the slave units arranged on the first communication path 61 one after the other, with the telegram processing unit 520 in the processing device 52 processing the passing telegram. After processing, the last slave unit 5-N on the first communication path 61 of the slave data bus 6 transmits the second telegram with identifier 2 to port_P1 41 of the second distributor 4.

The second telegram having the identifier 2 is forwarded in the second distributor 4 via the internal data link 44 to the switching device 43, which routes the telegram to both port_P0 40 and port_P2 42 based on the transfer table stored in the second distributor 4.

Port_P0 40 of the second distributor 4 transmits the second telegram having the identifier 2 via the substitute data bus 8 to port_P0 20 of the substitute master unit 2.

The second telegram having the identifier 2 output from port_P2 42 of the second distributor 4 on the first communication path 61 of the slave data bus 6 is received by port_P2 32 of the first distributor 3 and routed by the switching device 33 of the first distributor 3 in accordance with the above section of the transfer table of the first distributor 3 via the internal data link 34 to port_P0 30, which transmits the second telegram having the identifier 2 on the main data bus 7 to port_P0 10 of the main master unit 1.

After the circulation of the first telegram having identifier 1 and the second telegram having identifier 2 has been completed, both telegrams are identically present in the controller 11 of the main master unit 1 as well as in the controller 21 of the substitute master unit 2. The controller 11 of the main master unit 1 and the controller 21 of the substitute master unit 2 then order the user data blocks of the first telegram with identifier 1 and of the second telegram with identifier 2 in the standard operating mode in the event of a route error, so that a combined user data block is generated in which all the data to be transmitted by the slave units is contained, irrespective of how the telegrams were fed back via the first and the second communication paths.

FIG. 4B shows the substitute operation mode in the master-slave automation system according to FIG. 1 after failure of the main master unit 1, in which the substitute master unit 2 controls the telegram traffic in the master-slave automation system, wherein a route error has additionally occurred in the slave data bus 6. When a route error occurs in the slave data bus 6, the two slave units adjacent to the error location automatically enter an error mode in which the coupling device 521 in the processing device 52 of the slave unit 5 in the embodiment shown in FIG. 2 uses the first changeover switch 5211 and the second changeover switch 5212 to short-circuit the first communication path 61 and the second communication path 62 to divert the telegrams from one communication path to the other communication path.

As in the regular substitute operation mode of the master-slave automation system, a third telegram with identifier 3 and a fourth telegram with identifier 4, which have an identical user data block, are generated by the controller 21 of the substitute master unit 2 and transmitted via port_P0 20 on the substitute data bus 8 to port_P0 40 of the second distributor 4.

By short-circuiting the first communication path 61 and the second communication path 62 in the two slave units adjacent to the error location in the slave data bus 6, which is not explicitly shown in FIG. 4B, a loop-shaped telegram transmission takes place via the first communication path 61 and the second communication path 62 of the slave data bus 6. The transmission path for the third telegrams having the identifier 3 sent by the substitute master unit 2 is shown as a solid line in FIG. 4B. The transmission path for the fourth telegrams having the identifier 4 sent by the main master unit 1 is entered as a dotted line in FIG. 4B.

In the following, the circulation of the third telegram having the identifier 3 starting from the second distributor 4 is described, wherein the section of the transfer table of the second distributor 4 for the passage of third telegrams having the identifier 3 in the substitute operating mode in the event of a route error is reproduced here.

TABLE 15

(FIG. 4B): Transfer table of the second distributor 4 in the substitute operating mode in the event of a route error

| Telegram identifier | Receiving port | Transmitting port |
|---|---|---|
| 3 | P0 | P2 |
| 3 | P1 | P0 |
| 3 | P2 | P1 |

After receipt via port_P0 40, the third telegram with identifier 3 in the second distributor 4 is routed to the switching device 43 via the internal data link 44. The switching device 43 of the second distributor 4 then routes the telegram using the transfer table to port_P2 42 of the second distributor 4, which transmits the third telegram with identifier 3 on the first communication path 61 of the slave data bus 6 to port_P2 32 of the first distributor 3.

In the first distributor 3, the third telegram having the identifier 3 in the first distributor 3 is forwarded via the internal data link 34 to the switching device 33, which routes the telegram on the basis of the transfer table stored in the first distributor 3. The following shows the section of the transfer table of the first distributor 3 for the routing of third telegrams having the identifier 3 in the substitute operating mode in the event of a route error.

TABLE 16

(FIG. 4B): Transfer table of the first distributor 3 in substitute operation mode in case of a route error.

| Telegram identifier | Receiving port | Transmitting port |
|---|---|---|
| 3 | P2 | P0, P1 |
| 3 | P1 | P0, P2 |

The third telegram having identifier 3 received on port_P2 32 is forwarded by the switching device 33 of the first distributor 3 via the internal data link 34 to both port_P0 30 and port_P1 31.

Port_P0 40 of the first distributor 3 then attempts to transmit the third telegram having the identifier 3 via the main data bus 7 to port_P0 10 of the main master unit 1. However, since the main master unit 1 has failed, the telegram is not received.

From port_P1 31 of the first distributor 3, the third telegram with identifier 3 is output on the first communication path 61 of the slave data bus 6. The third telegram having the identifier 3 runs through the slave units arranged on the first communication path 61 one after the other until it reaches the slave unit that is adjacent to the route error. The third telegram having the identifier 3 is received in each case by port_P1 50 of the slave unit 5 and forwarded via the internal data link 53 to the processing device 52 of the slave unit 5, the telegram processing unit 520 of which carries out a data exchange with the passing third telegram having the identifier 3. After processing, the third telegram having the identifier 3 is then transferred via the internal data link 53 to port_P2 51 of the slave unit 5, which then sends the telegram further along the first communication path 61.

In the slave unit adjacent to the route error, the third telegram having the identifier 3, after processing by the processing unit 520, is returned to port_P1 50 instead of port_P2 51 by a corresponding changeover in the second changeover switch 5212 of the coupling device 521, which outputs the third telegram having the identifier 3 on the second communication path 62. The third telegram with identifier 3 then runs through the slave units on the second communication path 62 in the opposite direction, without being processed further until it reaches the first slave unit 5-1.

The first slave unit 5-1 then transmits the third telegram having the identifier 3 to port_P1 31 of the first distributor 3. The third telegram having the identifier 3 is forwarded via the internal data link 34 to the switching device 33 of the first distributor 3, which routes the telegram to port_P0 30 and to port_P2 32 based on the preceding transfer table stored in the first distributor 3.

Port_P0 40 of the first distributor 3 then attempts to transmit the third telegram having the identifier 3 again via the main data bus 7 to port_P0 10 of the main master unit 1. However, since the main master unit 1 has failed, the telegram is not received.

In addition, port_P2 40 of the first distributor 3 sends the third telegram having the identifier 3 on the first communication path 61 to port_P2 42 of the second distributor 4. The third telegram having the identifier 3 is forwarded in the second distributor 4 via the internal data link 44 to the switching device 43, which routes the telegram to port_P0 40 of the second distributor 4 based on the transfer table stored in the second distributor 4.

Port_P0 40 of the second distributor 4 transmits the third telegram having the identifier 3 on the substitute data bus 8 to port_P0 20 of the substitute master unit 1.

In the following, the circulation of the fourth telegram having the identifier 4 starting from the second distributor 4 is described:

After receipt via port_P0 40, the fourth telegram having the identifier 4 in the second distributor 4 is forwarded to the switching device 43 via the internal data link 44. The switching device 43 of the second distributor 4 then routes the telegram on the basis of the transfer table of the second distributor 4, of which the section of the transfer table of the second distributor 4 for the routing of fourth telegrams having the identifier 4 in the substitute operating mode in the event of a route error is reproduced again for clarification.

TABLE 17

(FIG. 3B): Transfer table of the second distributor 4 in substitute operating mode in case of a route error.

| Telegram identifier | Receiving port | Transmitting port |
|---|---|---|
| 4 | P0 | P1 |
| 4 | P2 | P0 |
| 4 | P2 | P0, P2 |

As may be seen from the transfer table, after evaluating the telegram identifier, the switching device 43 of the second distributor 3 forwards the fourth telegram having the identifier 4 to port_P1 41, which outputs the telegram on the second communication path 62 of the slave data bus 6.

The fourth telegram having the identifier 4 successively passes through the slave units arranged on the second communication path 62 until it reaches the slave unit which is adjacent to the route error, the fourth telegram having the identifier 4 circulating in the opposite direction to the third telegram having the identifier 3 on the second communication path 62, i.e. starting from slave unit 5-N.

The fourth telegram having the identifier 4 is received in each case by port_P2 51 of the slave unit 5 and transferred via the internal data link 53 to the processing device 52 of the slave unit 5, which forwards the fourth telegram having the identifier 4 unprocessed to port_P1 50, from where the telegram is sent on the second communication path 62.

In the slave unit adjacent to the route error, the fourth telegram having the identifier 4 is transferred to the telegram processing unit 520 instead of to port_P1 50 by a corresponding changeover in the first changeover switch 5211 of the coupling device 521, which performs a data exchange with the fourth telegram having the identifier 4. The processed fourth telegram with identifier 4 is then output from port_P2 51 of the slave unit on the second communication path 62.

The fourth telegram having the identifier 4 then passes through the slave units on the second communication path 62 in the opposite direction as far as the first slave unit 5-1, the telegram processing unit 520 of the processing device 52 carrying out a data exchange in each case with the passing fourth telegram having the identifier 4.

The last slave unit 5-N then transmits the fourth telegram with identifier 4 to port_P1 41 of the second distributor 4. The second telegram with identifier 4 is forwarded via the internal data link 44 to the switching device 43 of the second distributor 4, which routes the telegram to both port_P0 40 and port_P2 42 based on the preceding transfer table stored in the second distributor 4.

Port_P0 40 of the second distributor 4 transmits the third telegram having the identifier 4 on the substitute data bus 8 to port_P0 20 of the substitute master unit 2.

The fourth telegram having the identifier 4 output via port_P2 42 of the second distributor 4 is received by port_P2 32 of the first distributor 3 on the second communication path 62 of the slave data bus 6 and is routed by the switching device 33 of the first distributor 3 to port_P0 30 via the internal data link 34 in accordance with the above section of the transfer table of the first distributor 3.

Port_P0 30 of the first distributor 3 then attempts to transmit the fourth telegram having the identifier 4 via the main data bus 7 to port_P0 10 of the main master unit 1. However, since the main master unit 1 has failed, the telegram is not received.

After the circulation of the third telegram having identifier 3 and the fourth telegram having identifier 4 has been completed, the controller 21 of the substitute master unit 2 in the substitute operation mode in the event of a route error orders the user data blocks of the third telegram with identifier 3 and the fourth telegram with identifier 4, thereby generating a combined user data block in which all the data to be transmitted by the slave units are included irrespective of how the telegrams were fed back via the first and second communication paths.

The controller 21 of the substitute master unit 2 is further embodied to transmit the third telegrams with identifier 3 and fourth telegrams with identifier 4 received in the substitute operating mode from the controller 21 of the substitute master unit 2 and processed by the slave units 5-1 to 5-N to the controller 11 of the main master unit 1 when switching back to the standard operating mode, then when the main master unit 1 is active again. In this way, the controller 11 of the main master unit 1 may seamlessly connect to the telegram traffic in the substitute operating mode when returning to the standard operating mode.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 18

List of reference symbols

| | |
|---|---|
| 1 Main master unit | Port_P0 10 Transmitting/receiving device of main master unit |
| 2 Substitute master unit | TX 101 Transmitting device of port_P0 10 |
| 3 First distributor | RX 102 Receiving device of port_P0 10 |
| 4 Second distributor | Port_P0 20 Transmitting/receiving device of the substitute master unit |
| 5 Slave unit | TX 201 Sending unit of port_P0 20 |
| 6 Slave data bus | RX 202 Receiving unit of port_P0 20 |
| 7 Main data bus | Port_P0 30 Master transmitting/receiving device of first distributor |
| 8 Substitute data bus | TX 301 Transmitting device of port_P0 30 |
| 11 Main master unit controller | RX 302 Receiving device of port_P0 30 |
| 12 Data link | Port_P1 31 First transmitting/receiving device of first distributor |
| 21 Substitute master unit controller | TX 311 Transmitting device of port_P1 31 |
| 22 Data link | RX 312 Receiving device of port_P1 31 |
| 33 Switching device | Port_P2 32 Second transmitting/receiving device of first distributor |
| 34 Data link | TX 321 Transmitting device of ort_P2 32 |
| 43 Switching device | RX 322 Receiving device of port_P2 32 |
| 44 Data link | Port_P0 40 Master transmitting/receiving device of second distributor |
| 52 Processing device | TX 401 Transmitting device of port_P0 40 |
| 53 Data link | RX 402 Receiving device of port_P0 40 |
| 61 First communication path | Port_P1 41 First transmitting/receiving device of second distributor |
| 62 Second communication path | TX 411 Transmitting device of port_P1 41 |
| 71 First unidirectional communication path | RX 412 Receiving device of port_P1 41 |
| 72 Second unidirectional communication path | Port_P2 42 Second transmitting/receiving device of second distributor |
| 81 First unidirectional communication path | TX 421 Transmitting device of port_P2 42 |
| 82 Second unidirectional communication path | RX 422 Receiving device of port_P2 42 |
| 520 Telegram processing device | Port_P1 50 First transmitting/receiving device of slave unit |
| 521 Coupling device | TX 501 Transmitting device of port_P1 50 |
| 5211 First changeover switch | RX 502 Receiving device of port_P1 50 |
| 5212 Second changeover switch | Port_P1 51 Second transmitting/receiving device of slave unit |
| | TX 511 Transmitting device of port_P1 51 |
| | RX 512 Receiving device of port_P1 51 |

What is claimed is:

1. An automation system comprising:
  a plurality of subscribers; and
  a ring-shaped data bus;
  wherein the subscribers comprise a first primary unit, a first distributor, a second primary unit, a second distributor and at least a slave secondary unit;
  wherein the first primary unit and the second primary unit each comprises a controller configured to generate telegrams, the telegrams each comprising a control data block having an individual identifier and a user data block;
  a switching device, a first transmitting/receiving device and a second transmitting/receiving device of the first distributor, wherein the switching device is connected to the controller of the first primary unit and the first and second transmitting/receiving devices to transmit the telegrams between the controller of the first primary unit, the first transmitting/receiving device and the second transmitting/receiving device, after evaluating individual identifiers contained in the telegrams on the basis of a first switching control set defined in the switching device;
  wherein the second distributor comprises a switching device, a first transmitting/receiving device and a second transmitting/receiving device of the second distributor, the switching device being connected to the controller of the second primary unit and the first and second transmitting/receiving device to transmit the telegrams between the controller of the second primary unit, the first transmitting/receiving device and the second transmitting/receiving device, after evaluating individual identifiers contained in the telegrams on the basis of the second switching control set defined in the switching device;

wherein the first transmitting/receiving device of the first distributor and the second distributor are connected via the ring-shaped data bus to transmit the telegrams between the first transmitting/receiving devices of the first distributor and of the second distributor;

wherein the second transmitting/receiving devices of the first distributor and of the second distributor are connected via the ring-shaped data bus in order to transmit the telegrams between the second transmitting/receiving device of the first distributor and of the second distributor; and a processing device, a first transmitting/receiving device and a second transmitting/receiving device of the secondary unit, wherein the processing device is connected to the first transmitting/receiving device and the second transmitting/receiving device and is configured to process said telegrams exchanged between the first transmitting/receiving device and the second transmitting/receiving device;

wherein the first transmitting/receiving device of the secondary unit is connected to the data bus to exchange the telegrams on the data bus with the first transmitting/receiving device of the first distributor, and wherein the second transmitting/receiving device of the secondary unit is connected to the data bus in order to exchange the telegrams on the data bus with the first transmitting/receiving device of the second distributor;

and further wherein, in a first operating mode:
the first switching control set defined in the switching device of the first distributor is configured to forward said telegrams received from the first primary unit to the first transmitting/receiving device and to forward the telegrams received by the second transmitting/receiving device to the first primary unit, and the second switching control set defined in the switching device of the second distributor is configured to forward first telegrams received by the first transmitting/receiving device to the second transmitting/receiving device; and in a second operating mode:
the second switching control set defined in the switching device of the second distributor is configured to forward said telegrams received by the second primary unit to the second transmitting/receiving device, and to forward the telegrams received by the first transmitting/receiving device to the second primary unit, and the first switching control set defined in the switching device of the first distributor is configured to forward the telegrams received by the second transmitting/receiving device to the first transmitting/receiving device.

2. The automation system according to claim 1, wherein:
the data bus comprises a first communication path and a second communication path;
the first transmitting/receiving device of the first distributor and the second distributor are respectively connected to the first communication path and the second communication path of the data bus to transmit said telegrams on the first communication path and the second communication path of the data bus;

wherein the first transmitting/receiving device of the secondary unit are connected to the first communication path and the second communication path of the data bus to exchange the telegrams on the first communication path and the second communication path of the data bus with the first transmitting/receiving device of the first distributor, and wherein the second transmitting/receiving device of the secondary unit is connected to the first communication path and the second communication path of the data bus in order to exchange the telegrams on the first communication path and the second communication path of the data bus with the first transmitting/receiving device of the second distributor;

and further wherein, in the first operating mode:
the controller of the first primary unit is configured to generate first telegrams having a first identifier and second telegrams having a second identifier, which comprise an identical user data block, the first switching control set defined in the switching device of the first distributor is configured to forward said first telegrams received from the first primary unit to the first transmitting/receiving device and said second telegrams received from the first primary unit to the second transmitting/receiving device, and to forward the second telegrams received by the first transmitting/receiving device and the first telegrams received by the second transmitting/receiving device to the first primary unit, and the second switching control set defined in the switching device of the second distributor is configured to forward the second telegrams received by the second transmitting/receiving device to the first transmitting/receiving device, and to forward the first telegrams received by the first transmitting/receiving device to the second transmitting/receiving device; and wherein, in the second operating mode:
the controller of the second primary unit generates third telegrams having a third identifier and fourth telegrams having a fourth identifier which comprise an identical user data block, the second switching control set defined in the switching device of the second distributor is configured to forward said third telegrams received from the second primary unit to the second transmitting/receiving device and said fourth telegrams received from the second primary unit to the first transmitting/receiving device, and to forward the third telegrams received by the first transmitting/receiving device and the fourth telegrams received by the second transmitting/receiving device to the second primary unit, and the first switching control set defined in the switching device of the first distributor is configured to forward the third telegrams received by the second transmitting/receiving device to the first transmitting/receiving device, and to forward the fourth telegrams received by the first transmitting/receiving device to the second transmitting/receiving device.

3. The automation system according to claim 2, further comprising:
a coupling device of the secondary unit, wherein the coupling device is configured, when an error occurs while transmitting data to the subscriber connected to the first transmitting/receiving device, for short-circuiting the first communication path and the second communication path in the first transmitting/receiving device, and when an error occurs while transmitting data to the subscriber connected to the second transmitting/receiving device, for short-circuiting the first communication path and the second communication path in the second transmitting/receiving device;

wherein furthermore, in the first operating mode:
the first switching control set defined in the switching device of the first distributor is configured to forward first telegrams received by the first transmitting/receiving device and second telegrams received by the second transmitting/receiving device to the first primary unit, and the second switching control set defined in the switching device of the second distributor is configured to forward the second telegrams received by the first transmitting/receiving device to the second transmitting/receiving device; and in the second operating mode:
the first switching control set defined in the switching device of the first distributor is configured to forward third telegrams received by the first transmitting/receiving device to the second transmitting/receiving device, and the second switching control set defined in the switching device of the second distributor is configured to forward the third telegrams received by the second transmitting/receiving device and fourth telegrams received by the second transmitting/receiving device to the second primary unit.

4. The automation system according to claim 1, wherein:
the first operating mode is a standard operating mode; and
in the first operating mode, the second switching control set defined in the switching device of the second distributor is additionally configured to forward said telegrams received by the first transmitting/receiving device to the second primary unit.

5. The automation system according to claim 4, wherein the controller of the second primary unit is configured to monitor the standard operating mode to take up the second operating mode upon detection of an interruption of the standard operating mode.

6. The automation system according to claim 5, wherein the controller of the second primary unit is configured to transmit the telegrams received in the second operating mode from the controller of the second primary unit to the controller of the first primary unit when the standard operating mode is resumed.

7. The automation system according to claim 1, wherein:
the first mode of operation is a standard operating mode; and
in the first mode of operation, the second switching control set defined in the switching device of the second distributor forwards said telegrams received by the first transmitting/receiving device additionally to the second primary unit.

8. The automation system according to claim 7, wherein the controller of the second primary unit is configured to monitor the standard operating mode to take up the second mode of operation upon detection of an interruption of the standard operating mode.

9. The automation system according to claim 8, wherein the controller of the second primary unit is configured to transmit the telegrams received in the second mode of operation from the controller of the second primary unit to the controller of the first primary unit when the standard operating mode is resumed.

10. A method for telegram transmission in an automation system having a plurality of subscribers and a ring-shaped data bus, wherein:
the subscribers comprise a first primary unit, a first distributor, a second primary unit, a second distributor and at least a secondary unit;

wherein the first primary unit and the second primary unit each comprise a controller which generates telegrams, wherein the telegrams each comprise a control data block having an individual identifier and a user data block, wherein the first distributor comprises a switching device, a first transmitting/receiving device and a second transmitting/receiving device, wherein the switching device is connected to the controller of the first primary unit and to the first and second transmitting/receiving devices, to transmit the telegrams between the controller of the first primary unit, the first transmitting/receiving device and the second transmitting/receiving device after evaluating individual identifiers contained in the telegrams on the basis of a first switching control set defined in the switching device, and wherein the second distributor comprises a switching device, a first transmitting/receiving device and a second transmitting/receiving device, wherein the switching device is connected to a controller of the second primary unit and the first and second transmitting/receiving device to transmit the telegrams between the controller of the second primary unit, the first transmitting/receiving device and the second transmitting/receiving device after evaluating individual identifiers contained in the telegrams on the basis of the second switching control set defined in the switching device;

wherein the method comprises:
the first transmitting/receiving device of the first distributor and the second distributor being connected via the ring-shaped data bus to transmit the telegrams between the first transmitting/receiving devices of the first distributor and of the second distributor, and the second transmitting/receiving devices of the first distributor and of the second distributor being connected via the ring-shaped data bus to transmit the telegrams between the second transmitting/receiving device of the first distributor and of the second distributor;

wherein the secondary unit comprises a processing device, a first transmitting/receiving device and a second transmitting/receiving device, the processing device being connected to the first transmitting/receiving device and the second transmitting/receiving device to process said telegrams exchanged between the first transmitting/receiving device and the second transmitting/receiving device, the first transmitting/receiving device being connected to the data bus to exchange the telegrams on the data bus with the first transmitting/receiving device of the first distributor, and the second transmitting/receiving device being connected to the data bus to exchange the telegrams on the data bus with the first transmitting/receiving device of the second distributor;

and further wherein, in a first operating mode:
the first switching control set defined in the switching device of the first distributor forwards said telegrams received from the first primary unit to the first transmitting/receiving device the first switching control set defined in the switching device of the first distributor forwards the telegrams received by the second transmitting/receiving device to the first primary unit, and the second switching control set defined in the switching device of the second distributor forwards first telegrams received by the first transmitting/receiving device to the second transmitting/receiving device; and wherein, in a second operating mode;
the second switching control set defined in the switching device of the second distributor forwards said telegrams received by the second primary unit to the second transmitting/receiving device, the second switching control set defined in the switching device of the second distributor forwards the telegrams received by the first transmitting/receiving device to the second primary unit, and the first switching control set defined in the switching device of the first distributor forwards the telegrams received by the second transmitting/receiving device to the first transmitting/receiving device.

11. The method according to claim 10, wherein:
the data bus comprises a first communication path and a second communication path,
the first transmitting/receiving device of the first distributor and the second distributor are respectively connected to the first communication path and the second communication path of the data bus for transmitting said telegrams on the first communication path and the second communication path of the data bus,
the first transmitting/receiving device of the secondary unit is connected to the first communication path and the second communication path of the data bus to exchange the telegrams on the first communication path and the second communication path of the data bus with the first transmitting/receiving device of the first distributor, and
the second transmitting/receiving device of the secondary unit is connected to the first communication path and the second communication path of the data bus in order to exchange the telegrams on the first communication path and on the second communication path of the data bus with the first transmitting/receiving device of the second distributor;

and further wherein, in the first operating mode;
the controller of the first primary unit generates first telegrams having a first identifier and second telegrams having a second identifier, which have an identical user data block,
the first switching control set defined in the switching device of the first distributor forwards said first telegrams received from the first primary unit to the first transmitting/receiving device and said second telegrams received from the first primary unit to the second transmitting/receiving device, and forwards the second telegrams received by the first transmitting/receiving device and the first telegrams received by the second transmitting/receiving device to the first primary unit, and
the second switching control set defined in the switching device of the second distributor forwards the second telegrams received by the second transmitting/receiving device to the first transmitting/receiving device, and forwards the first telegrams received by the first transmitting/receiving device to the second transmitting/receiving device; and in the second operating mode:
the controller of the second primary unit generates third telegrams having a third identifier and fourth telegrams having a fourth identifier having an identical user data block,
the second switching control set defined in the switching device of the second distributor forwards said third telegrams received from the second primary unit to the second transmitting/receiving device and said fourth telegrams received from the second primary unit to the first transmitting/receiving device, and forwards the third telegrams received by the first transmitting/receiving device and the fourth telegrams received by the second transmitting/receiving device to the second primary unit, and
the first switching control set defined in the switching device of the first distributor forwards the third telegrams received by the second transmitting/receiving device to the first transmitting/receiving device, and the first switching control set defined in the switching device of the first distributor forwards the fourth telegrams received by the first transmitting/receiving device to the second transmitting/receiving device.

12. The method according to claim 11, wherein;
the secondary unit further comprises a coupling device which short-circuits the first communication path and the second communication path in the first transmitting/receiving device when an error occurs while transmitting data to the subscriber connected to the first transmitting/receiving device, and short-circuiting the first communication path and the second communication path in the second transmitting/receiving device when an error occurs while transmitting data to the subscriber connected to the second transmitting/receiving device;

and furthermore, in the first operating mode:
the first switching control set defined in the switching device of the first distributor forwards said first telegrams received by the first transmitting/receiving device and said second telegrams received by the second transmitting/receiving device to the first primary unit, and
the second switching control set defined in the switching device of the second distributor forwards the second telegrams received by the first transmitting/receiving device to the second transmitting/receiving device; and in the second operating mode:
the first switching control set defined in the switching device of the first distributor forwards said third telegrams received by the first transmitting/receiving device to the second transmitting/receiving device, and
the second switching control set defined in the switching device of the second distributor forwards the third telegrams received by the second transmitting/receiving device and said fourth telegrams received by the second transmitting/receiving device to the second primary unit.

13. The method according to claim 10, wherein;
the first operating mode is a standard operating mode; and
in the first operating mode, the second switching control set defined in the switching device of the second distributor additionally forwards said telegrams received by the first transmitting/receiving device to the second primary unit.

14. The method according to claim 13, wherein the controller of the second primary unit monitors the standard operating mode to take up the second operating mode if an interruption of the standard operating mode is detected.

15. The method according to claim 14, wherein the controller of the second primary unit, upon a resumption of the standard operating mode, transmits the telegrams received in the second operating mode from the controller of the second primary unit to the controller of the first primary unit.

16. An automation system comprising:
a plurality of subscribers, wherein each of the subscribers comprises a first primary unit, a first distributor, a second primary unit, a second distributor and at least a secondary unit;
first transmitting/receiving devices of the first distributor and first transmitting/receiving devices of the second distributor, which are connected via a ring-shaped data bus; and
second transmitting/receiving devices of the first distributor and second transmitting/receiving devices of the second distributor, which are connected via the ring-shaped data bus;
wherein, in a first mode of operation:
the first distributor forwards telegrams received from the first primary unit to the first transmitting/receiving device and furthermore, the first distributor forwards said telegrams received by the second transmitting/receiving device to the first primary unit, and
the second distributor forwards first telegrams received by the first transmitting/receiving device to the second transmitting/receiving device; and
wherein, in a second mode of operation:
the second distributor forwards telegrams received by the second primary unit to the second transmitting/receiving device and furthermore, the second distributor forwards said telegrams received by the first transmitting/receiving device to the second primary unit, and
the first distributor also forwards the telegrams received by the second transmitting/receiving device to the first transmitting/receiving device.

17. An automation system according to claim 16, wherein;
in the first mode of operation;
a first switching control set defined in a switching device of the first distributor forwards said telegrams received from the first primary unit to the first transmitting/receiving device, and forwards the telegrams received by the second transmitting/receiving device to the first primary unit, and
a second switching control set in a switching device of the second distributor forwards first telegrams received by the first transmitting/receiving device to the second transmitting/receiving device; and
in the second mode of operation;
the second switching control set defined in the switching device of the second distributor forwards said telegrams received by the second primary unit to the second transmitting/receiving device, and forwards the telegrams received by the first transmitting/receiving device to the second primary unit, and
the first switching control set defined in the switching device of the first distributor forwards the telegrams received by the second transmitting/receiving device to the first transmitting/receiving device.

18. The automation system according to claim 16, wherein:
in the first mode of operation;
a controller of the first primary unit generates first telegrams having a first identifier and second telegrams having a second identifier, which have an identical user data block,
the first switching control set defined in the switching device of the first distributor forwards said first telegrams received from the first primary unit to the first transmitting/receiving device and said second telegrams received from the first primary unit to the second transmitting/receiving device, and forwards the second telegrams received by the first transmitting/receiving device and the first telegrams received by the second transmitting/receiving device to the first primary unit, and
the second switching control set defined in the switching device of the second distributor forwards the second telegrams received by the second transmitting/receiving device to the first transmitting/receiving device, and forwards the first telegrams received by the first transmitting/receiving device to the second transmitting/receiving device; and
wherein, in the second mode of operation:
a controller of the second primary unit generates third telegrams having a third identifier and fourth telegrams having a fourth identifier having an identical user data block,
the second switching control set defined in the switching device of the second distributor forwards said third telegrams received from the second primary unit to the second transmitting/receiving device and said fourth telegrams received from the second primary unit to the first transmitting/receiving device, and forwards the third telegrams received by the first transmitting/receiving device and the fourth telegrams received by the second transmitting/receiving device to the second primary unit, and
the first switching control set defined in the switching device of the first distributor forwards the third telegrams received by the second transmitting/receiving device to the first transmitting/receiving device, and forwards the fourth telegrams received by the first transmitting/receiving device to the second transmitting/receiving device.

\* \* \* \* \*

UNITED STATES PATENT AND TRADEMARK OFFICE
CERTIFICATE OF CORRECTION

PATENT NO. : 12,316,474 B2
APPLICATION NO. : 18/186649
DATED : May 27, 2025
INVENTOR(S) : Holger Büttner et al.

It is certified that error appears in the above-identified patent and that said Letters Patent is hereby corrected as shown below:

In the Specification

At Column 1, Line 16:
"Verteiler and Verfahren"
Should be:
--Verteiler und Verfahren--

In the Claims

At Column 34, Line 46 (Claim 1, Line 6):
"at least a slave secondary unit;"
Should be:
--at least a secondary unit;--

At Column 34, Line 63 (Claim 1, Line 23), please delete:
"wherein the second distributor comprises"

At Column 39, Line 10 (Claim 10, Line 74):
"wherein, in a second operating mode;"
Should be:
--in a second operating mode:--

At Column 40, Lines 20–21 (Claim 11, Lines 65–66), please delete:
"the first switching control set defined in the switching device of the first distributor"

At Column 40, Line 25 (Claim 12, Line 1):
"wherein;"
Should be:
--wherein:--

Signed and Sealed this
Nineteenth Day of August, 2025

Coke Morgan Stewart
*Acting Director of the United States Patent and Trademark Office*

CERTIFICATE OF CORRECTION (continued)
U.S. Pat. No. 12,316,474 B2

At Column 40, Line 61 (Claim 13, Line 1):
"wherein;"
Should be:
--wherein:--

At Column 41, Line 33 (Claim 16, Line 23):
"wherein, in a second mode of operation:"
Should be:
--in a second mode of operation:--

At Column 41, Line 43 (Claim 17, Line 1):
"wherein;"
Should be:
--wherein:--

At Column 41, Line 44 (Claim 17, Line 2):
"in the first mode of operation;"
Should be:
--in the first mode of operation:--

At Column 41, Line 55 (Claim 17, Line 13):
"in the second mode of operation;"
Should be:
--in the second mode of operation:--

At Column 42, Line 34 (Claim 18, Line 25):
"wherein, in the second mode of operation:"
Should be:
--in the second mode of operation:--